US012385398B2

(12) United States Patent
Tommasini

(10) Patent No.: US 12,385,398 B2
(45) Date of Patent: Aug. 12, 2025

(54) FLUID TURBINE ASSEMBLY AND METHOD OF ACTUATION OF A FLUID TURBINE

(71) Applicant: GAIA TURBINE SA, Lugano (CH)

(72) Inventor: Franco Tommasini, Camorino (CH)

( * ) Notice: Subject to any disclaimer, the term of this patent is extended or adjusted under 35 U.S.C. 154(b) by 0 days.

(21) Appl. No.: 18/559,402

(22) PCT Filed: May 26, 2021

(86) PCT No.: PCT/IB2021/054566
§ 371 (c)(1),
(2) Date: Nov. 7, 2023

(87) PCT Pub. No.: WO2022/248912
PCT Pub. Date: Dec. 1, 2022

(65) Prior Publication Data

US 2024/0254956 A1 Aug. 1, 2024

(51) Int. Cl.
*F01D 1/32* (2006.01)
*F03B 1/04* (2006.01)

(52) U.S. Cl.
CPC . *F01D 1/32* (2013.01); *F03B 1/04* (2013.01)

(58) Field of Classification Search
CPC ...... F03B 1/00; F03B 1/02; F03B 1/04; F03D 1/32
See application file for complete search history.

(56) References Cited

U.S. PATENT DOCUMENTS 2,840,341 A 6/1958 Hudyma
8,946,922 B1 2/2015 Johnson
2005/0236842 A1 10/2005 Alstot
2010/0158705 A1 6/2010 Guinard
2024/0229756 A1 * 7/2024 Tommasini ............... F03B 3/08
(Continued)

FOREIGN PATENT DOCUMENTS

GB 481065 A 3/1938
WO 2014122612 A2 8/2014

OTHER PUBLICATIONS

European Patent Office, First International Search Report for PCT/IB2021/054566, Jan. 24, 2022, EPO, P.B. 5818 Patentlaan2, NL-2280 HV Rijswijk.

(Continued)

*Primary Examiner* — Christopher R Legendre
(74) *Attorney, Agent, or Firm* — UNDERWOOD & ASSOCIATES, LLC

(57) ABSTRACT

A fluid turbine assembly (1), comprising:
at least a main rotation shaft (2) being configured to rotate around a longitudinal rotation axis (X),
a main rotor (3) comprising a central portion and an outer portion, the main rotor (3) being installed on the main rotation shaft (2) in such a way to bring the main rotation shaft (2) in rotation with the main rotor (3),
an inlet assembly (4) for a fluid, said inlet assembly (4) being configured to drive fluid to the main rotor (3), wherein said inlet assembly (4) comprises a Venturi conduit (5) comprising a first inlet (5*a*) configured to be connected to, and to be fed in use with, a pressurized primary fluid source, and a second inlet (5*b*) configured to be submerged into, and to drag fluid from, a secondary fluid source (6) to the rotor (3) under the dragging effect caused by the fluid flowing in said first inlet (5*a*).

20 Claims, 8 Drawing Sheets

(56) References Cited

U.S. PATENT DOCUMENTS

2024/0254956 A1 * 8/2024 Tommasini ............... F03B 1/04

OTHER PUBLICATIONS

European Patent Office, Second International Search Report for PCT/IB2021/054566, Mar. 25, 2022, EPO, P.B. 5818 Patentlaan2, NL-2280 HV Rijswijk.
European Patent Office, First Written Opinion of the International Searching Authority for PCT/IB2021/054566, Jan. 24, 2022, EPO, P.B. 5818 Patentlaan2, NL-2280 HV Rijswijk.
European Patent Office, First Search Strategy for PCT/IB2021/054566, Jan. 24, 2022, EPO, P.B. 5818 Patentlaan2, NL-2280 HV Rijswijk.
European Patent Office, Second Search Strategy for PCT/IB2021/054566, Mar. 25, 2022, EPO, P.B. 5818 Patentlaan2, NL-2280 HV Rijswijk.
European Patent Office, Second Written Opinion of the International Searching Authority for PCT/IB2021/054566, Mar. 25, 2022, EPO, P.B. 5818 Patentlaan2, NL-2280 HV Rijswijk.

* cited by examiner

FIG.6
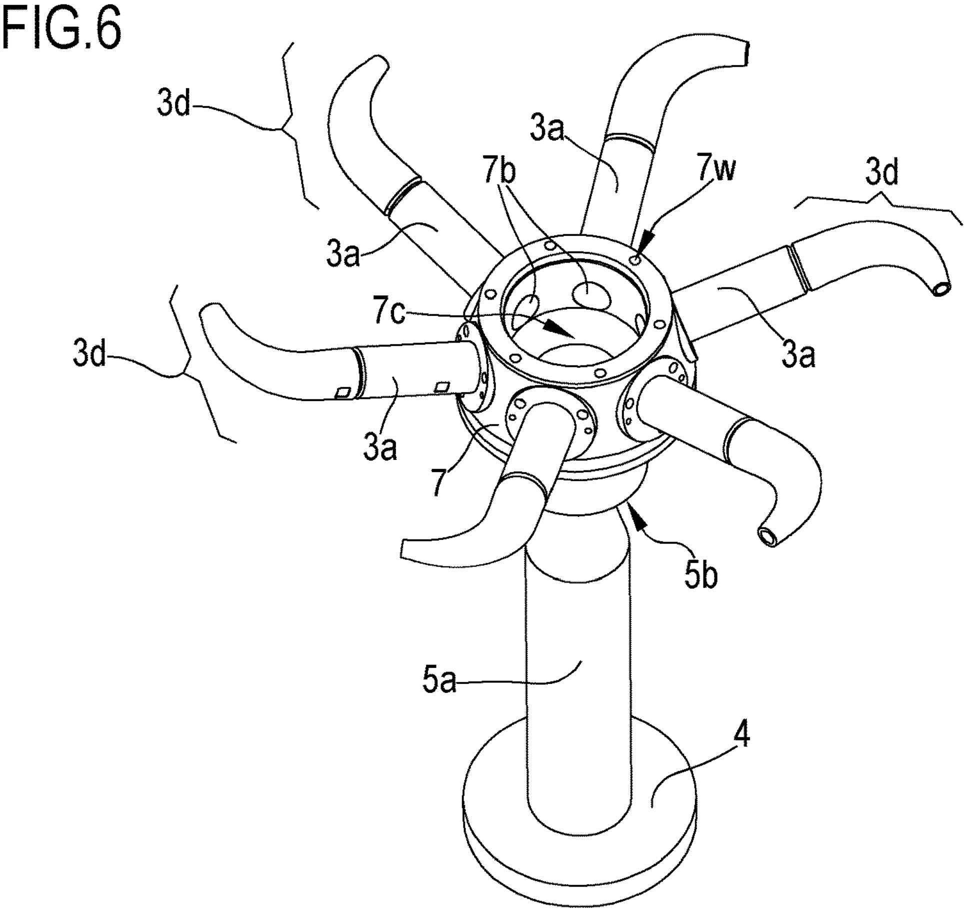
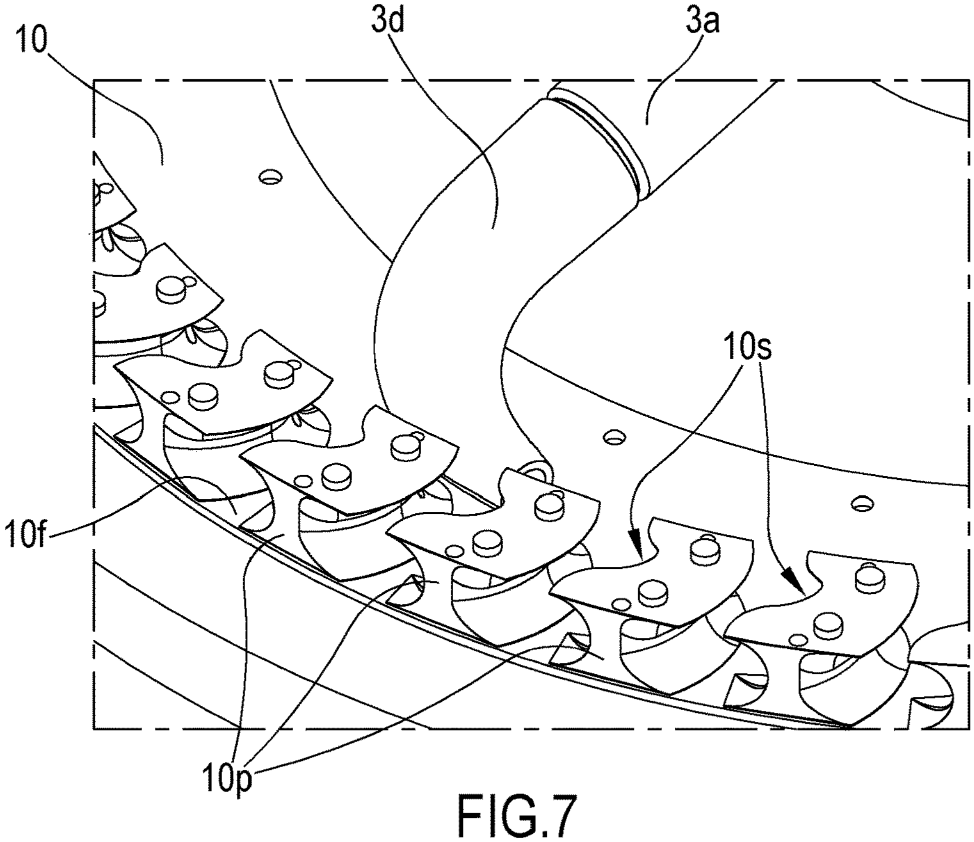
FIG.7

FIG.9
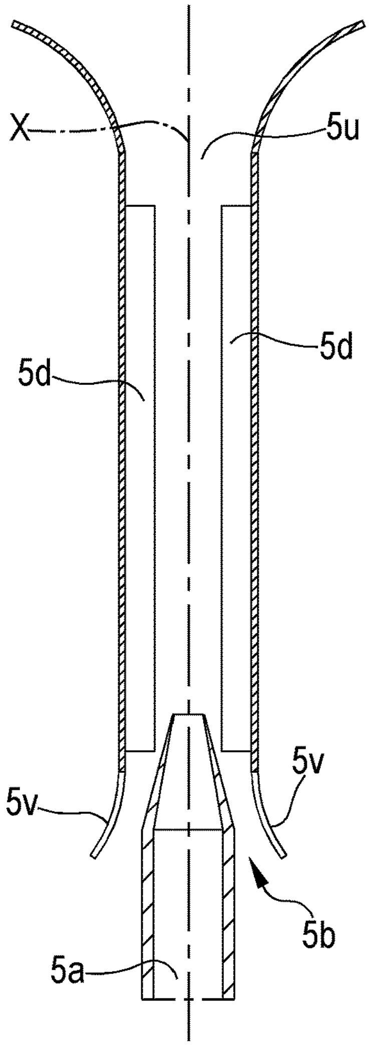
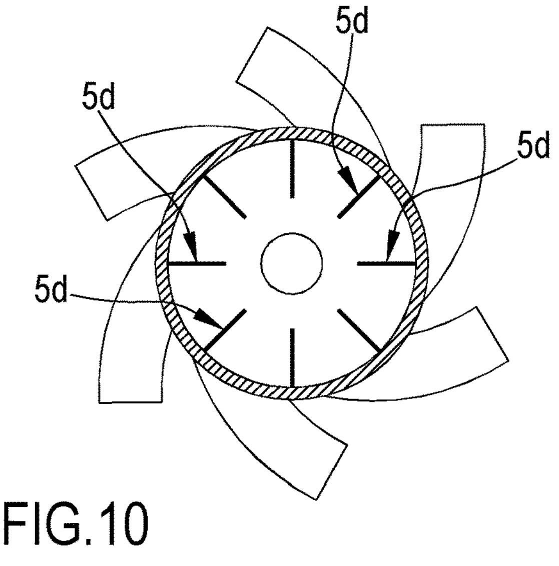
FIG.10
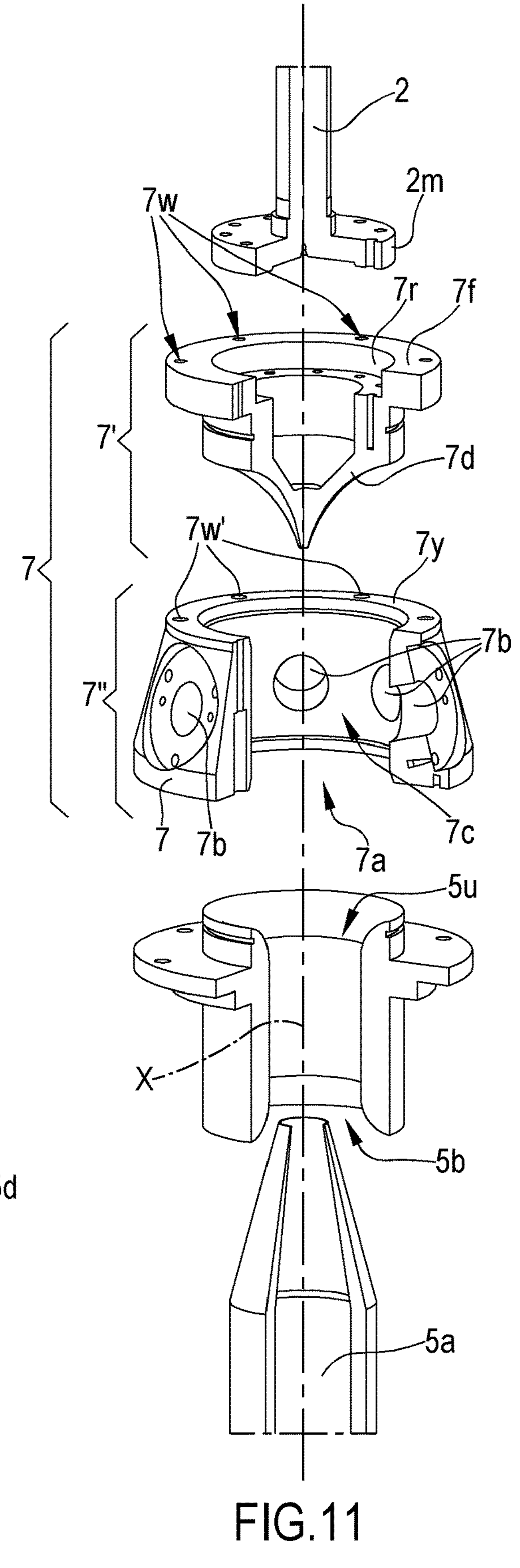
FIG.11

FLUID TURBINE ASSEMBLY AND METHOD OF ACTUATION OF A FLUID TURBINE

FIELD OF THE ART

The present disclosure refers to the field of turbomachinery and in detail concerns an improved fluid turbine assembly.

The present disclosure further refers to a method of actuation of a turbine.

BACKGROUND ART

Turbines are used for several applications, including electric energy production. Many turbines known today are fluid turbines, and exploit a hydraulic or piezometric head in order to make a rotor move, in particular rotate around an axis. According to the specific type of application, the rotor may be coupled to a generator, in particular an electric generator, which is suitable to produce electric current while being forced in rotation by the rotor.

Fluid turbines are divided into two main categories: impulse turbines and reaction turbines. Impulse turbines exploit substantially the entire piezometric head to produce rotation of the rotor and thus to generate torque. Reaction turbines, in contrast, develop torque by reacting to the fluid's pressure or mass.

It is further known that many turbines may be of a hybrid type and combine the operating principles of an impulse turbine and of a reaction turbine.

U.S. Pat. No. 2,840,341 discloses a turbine with active and reactive elements. In U.S. Pat. No. 2,840,341 the rotor is driven by the reactive force of fluid issuing from substantially tangential nozzles and wherein the issuing fluid reacts against a second rotor to cause the rotation thereof.

It is known that the turbines have several problems of efficiency. Some problems of efficiency have been solved by some turbines types that may be conveniently used in case there is the need of high hydraulic heads (like in the case of alpine hydroelectric plants, with Pelton wheels) at relatively low flow rates, or when there is the need of managing higher flow rates with lower hydraulic heads (this latter case seeing, in preference, the use of a Francis wheel as a preference), or—further—when relevant flow rates shall be managed with very low hydraulic heads (this latter case, seeing, in preference, the use of a Kaplan turbine as a preferred solution).

Nonetheless, the known turbines still have efficiency issues; this drawback is especially noticeable when the turbine manages significantly variable flow rates.

Thus the purpose of the present disclosure is to disclose a turbine and a method of actuation of a fluid turbine which solve the aforementioned drawbacks.

SUMMARY

The object of the present disclosure is herewith disclosed in several aspects, hereinafter presented. The aspects may be combined together in any suitable form, and/or may be combined with the detailed description and/or with the annexed claims.

Turbine Device

According to a first aspect, it is herewith disclosed a fluid turbine assembly (1), comprising:

- at least a main rotation shaft (2) being configured to rotate around a longitudinal rotation axis (X),
- a main rotor (3) comprising a central portion and an outer portion, the main rotor (3) being installed on the main rotation shaft (2) in such a way to bring the main rotation shaft (2) in rotation with the main rotor (3),
- an inlet assembly (4) for a fluid, said inlet assembly (4) being configured to drive the fluid to the main rotor (3), wherein said inlet assembly (4) comprises a Venturi conduit (5) comprising a first inlet (5*a*) configured to be connected to, and to be fed in use with, a pressurized primary fluid source, and a second inlet (5*b*) configured to be submerged into, and to drag fluid from, a secondary fluid source (6) to the rotor (3) under the dragging effect caused by the fluid flowing in said first inlet (5*a*).

For the purposes of the present disclosure, with "fluid" shall be intended any fluid, in particular water, or shall be intended any gas.

According to a further non-limiting aspect, the fluid comprises water.

According to a further non-limiting aspect, the primary fluid source is a primary water source.

According to a further non-limiting aspect, the secondary fluid source is a secondary water source.

According to a further non-limiting aspect, the secondary water source (6) is a non-pressurized water source.

According to a further non-limiting aspect, the secondary water source (6) is a draining pool, in particular a draining pool of a hydroelectric plant.

According to a further non-limiting aspect, the Venturi conduit (5) is configured to be fed in such a way that at least the second inlet (5*b*) lies below a fluid level of said secondary fluid source (6), and/or the Venturi conduit (5) is configured in such a way that, in use, the second inlet (5*b*) drags only fluid from the secondary fluid source (6).

According to a further non-limiting aspect, the fluid level is a water level.

According to a further non-limiting aspect, the Venturi conduit (5) is configured to be fed in such a way that at least the first inlet (5*a*) lies below a fluid level of said pressurized primary fluid source, and/or the Venturi conduit (5) is configured in such a way that, in use, the first inlet (5*a*) drags only fluid from the pressurized primary fluid source.

According to a further non-limiting aspect, the fluid turbine assembly (1) comprises a secondary fluid source (6) configured to feed fluid to the second inlet (5*b*) of the Venturi conduit (5) by making fluid reach said second inlet (5*b*).

According to a further non-limiting aspect, the Venturi conduit (5) is substantially aligned, in particular axially aligned, with the main rotation shaft (2).

According to a further non-limiting aspect, the second inlet (5*b*) annularly surrounds at least a part of the first inlet (5*a*) and/or has a funnel-type shape, optionally wherein said funnel-type shape is configured to draw fluid from around, in particular perimetrally around, at least one portion of the first inlet (5*a*).

According to a further non-limiting aspect, the first inlet (5*a*) is substantially aligned, in particular axially aligned, with the main rotation shaft (2).

According to a further non-limiting aspect, the Venturi conduit (5) comprises an outlet (5*u*) fed in use by the first and the second inlet (5*a*, 5*b*).

According to a further non-limiting aspect, the fluid turbine assembly (1) is configured to be fed by a fluid reservoir, in particular by a fluid reservoir arranged at an altitude higher than the altitude at which the fluid turbine assembly is arranged, and/or is configured to be fed by a penstock where, in use, water coming from a reservoir is made to flow to the inlet assembly (4).

According to a further non-limiting aspect, the pressurized primary fluid source comprises a fluid reservoir and/or comprises at least a part of a penstock fed by a fluid reservoir.

According to a further non-limiting aspect, the fluid reservoir is arranged at an altitude higher than the altitude at which the fluid turbine assembly is arranged.

According to a further non-limiting aspect, the fluid turbine assembly (1) is configured to re-use at least partially the fluid discharged by the main rotor (3) or used to feed said main rotor (3), optionally in the secondary fluid source (6), to feed said first inlet (5*a*).

According to a further non-limiting aspect, the second inlet (5*b*) is configured to be fed by a draining pool, in particular by a draining pool of a hydroelectric plant.

According to a further non-limiting aspect, the draining pool is fed through said penstock.

According to a further non-limiting aspect, the second inlet (5*b*) is configured to be fed by water discharged from at least the main rotor (3).

According to a further non-limiting aspect, the main rotor (3) is configured to discharge the fluid, optionally water, in said secondary fluid source (6).

According to a further non-limiting aspect, the main rotor (3) is a centrally fed rotor, and/or the inlet assembly (4) is configured to feed fluid to the main rotor (3) from the central portion thereof.

According to a further non-limiting aspect, the main rotor (3) comprises a plurality of hollow arms (3*a*) at least partially arranged along a radial direction, said plurality of hollow arms (3*a*) realizing a plurality of fluid distribution conduits configured to allow, in use, the distribution of fluid from the central portion of the main rotor (3) to the outer portion of the main rotor (3).

According to a further non-limiting aspect, the plurality of hollow arms (3*a*) is configured to distribute fluid uniformly along a plurality of directions, each direction being associated to at least one of said hollow arms (3*a*).

According to a further non-limiting aspect, the main rotor (3) is configured to distribute fluid at least partially by means of a centrifugal force on said fluid due to the rotation of the main rotor (3) around the longitudinal rotation axis (X), in particular being configured to distribute fluid at least partially by means of a centrifugal force on said fluid due to the rotation of the hollow arms (3*a*) of the main rotor (3) around said longitudinal rotation axis (X).

According to a further non-limiting aspect, each arm of the plurality of hollow arms (3*a*) comprises a central portion, and a distal portion (3*d*) substantially positioned at the outer portion of the main rotor (3), said distal portion being arranged in a direction substantially inclined with respect to a radial direction and to said longitudinal rotation axis (X), optionally being configured to direct, in use, fluid to a predetermined direction to cause the rotation of the main rotor (3) by means of a reaction force.

According to a further non-limiting aspect, the distal portion (3*d*) has a cross-section of a first size and the central portion has a cross-section of a second size, the first size being smaller than the second size, said distal portion being configured to increase an outlet fluid flow speed (s) for the fluid exiting the main rotor (3).

According to a further non-limiting aspect, the distal portion (3*d*) constitutes an outlet nozzle for the hollow arm (3*a*).

According to a further non-limiting aspect, the direction substantially inclined with respect to a radial direction is arranged substantially on a plane of rotation of the main rotor (3).

According to a further non-limiting aspect, the main rotor (3) is configured to rotate on a plane which is substantially horizontal.

According to a further non-limiting aspect, the distal portion (3*d*) is substantially oriented backwardly with respect to a direction of rotation of the main rotor (3).

According to a further non-limiting aspect, the main rotor (3) comprises a central distributor (7) comprising an inlet opening (7*a*) and a plurality of outlets (7*b*) connected in a fluid-tight connection each with a respective arm of said plurality of hollow arms (3*a*).

According to a further non-limiting aspect, the central distributor (7) is configured to distribute fluid from the inlet opening (7*a*) to the plurality of outlets (7*b*) by means of a redirection of the fluid provided to the main rotor (3) from an axial direction associated to the inlet opening (7*a*) to a plurality of substantially radial directions associated to the plurality of outlets (7*b*), wherein the axial direction is substantially parallel to the direction of the longitudinal rotation axis (X).

According to a further non-limiting aspect, the inlet opening (7*a*) of the central distributor (7) is connected to the outlet (5*u*) of the Venturi conduit (5), optionally being directly connected to the outlet (5*u*) of the Venturi conduit (5).

According to a further non-limiting aspect, the central distributor (7) is rigidly connected with the plurality of hollow arms (3*a*).

According to a further non-limiting aspect, the fluid turbine assembly (1) comprises a secondary rotor (10), said secondary rotor (10) being configured to be fed by the fluid coming from the main rotor (3).

According to a further non-limiting aspect, the secondary rotor (10) is configured to rotate on a plane which is substantially horizontal.

According to a further non-limiting aspect, the secondary rotor (10) is configured to discharge said fluid into the secondary fluid source (6), optionally to discharge said fluid directly into the secondary fluid source (6).

According to a further non-limiting aspect, the fluid turbine assembly (1) comprises an auxiliary rotation shaft (2*x*) operatively coupled to and, in use, put in rotation, by said secondary rotor (10).

According to a further non-limiting aspect, the auxiliary rotation shaft (2*x*) rotates around an axis which is parallel to said longitudinal rotation axis (X).

According to a further non-limiting aspect, the auxiliary rotation shaft (2*x*) is co-axial with the main rotation shaft (2).

According to a further non-limiting aspect, the auxiliary rotation shaft (2*x*) is hollow and comprises a through hole configured to house part of the main rotation shaft (2).

According to a further non-limiting aspect, the through hole is axially aligned with the longitudinal rotation axis (X).

According to a further non-limiting aspect, the secondary rotor (10) is an annular rotor laying outside the main rotor (3).

According to a further non-limiting aspect, the secondary rotor (10) is centered on said longitudinal rotation axis (X).

According to a further non-limiting aspect, the secondary rotor (10) lays substantially on a same plane on which the main rotor (3) lays.

According to a further non-limiting aspect, the secondary rotor (10) and the main rotor (3) are at least partially co-planar.

According to a further non-limiting aspect, the secondary rotor (10) is configured to rotate freely from the main rotor (3) and/or with respect to the main rotor (3).

According to a further non-limiting aspect, the secondary rotor (10) comprises a plurality of blades (10*b*) defining, each one, a striking surface (10*s*) for the fluid coming, in use, from the main rotor (3), optionally flowing, in use, from the plurality of hollow arms (3*a*).

According to a further non-limiting aspect, the striking surface (10*s*) defines a substantially curved wall extending mainly on a plane which is substantially orthogonal to the rotation plane of the secondary rotor (10) and is configured to deviate a fluid flow along a substantially curved path at least partially extending radially with respect to the longitudinal rotation axis (X).

According to a further non-limiting aspect, the secondary rotor (10) is configured and designed to rotate, in use, in a direction opposite to a rotation direction of the main rotor (3), in particular due to a force that the fluid coming, in use, from the main rotor (3), optionally flowing, in use, from the plurality of hollow arms (3*a*) causes on the plurality of blades (10*b*), optionally on the striking surface (10*s*) of the plurality of blades (10*b*).

According to a further non-limiting aspect, the secondary rotor (10) is configured to rotate independently and/or freely with respect to the main rotor (3).

According to a further non-limiting aspect, the secondary rotor (10) comprises at least one supporting disc (10*f*) on which said plurality of blades (10*b*) is rigidly connected.

According to a further non-limiting aspect, the secondary rotor (10) comprises a first and a second supporting disc (10*f*), on which said plurality of blades (10*b*) is rigidly connected.

According to a further non-limiting aspect, the fluid turbine assembly (1) is configured to be connected to a first generator (20) in turn connected to the main rotation shaft (2), and/or the fluid turbine assembly (1) is configured to be connected to a first generator (20) in turn connected to the main rotor (3), for transferring torque from the main rotation shaft (2) and/or from the main rotor (3) to the first generator (20).

According to a further non-limiting aspect, the fluid turbine assembly (1) is configured to be connected to a second generator (30) in turn connected to the auxiliary rotation shaft (2*x*), and/or the fluid turbine assembly (1) is configured to be connected to a second generator (30) in turn connected to the secondary rotor (10).

According to a further non-limiting aspect, the fluid turbine assembly (1) comprises said first generator (20) and/or said second generator (30).

According to a further non-limiting aspect, the first inlet (5*a*) of the Venturi conduit (5) comprises a tapered portion comprising an inner cross-section of a progressively reduced size when getting closer to an end thereof.

According to a further non-limiting aspect, the first generator (20) is co-axially installed on the main rotation shaft (2).

According to a further non-limiting aspect, each arm of the plurality of hollow arms (3*a*) mainly extends along a direction that is inclined, in particular inclined upwardly, with respect to the plane on which the main rotor (3) rotates, and/or extends along a direction which is not orthogonal with respect to said longitudinal rotation axis (X).

According to a further non-limiting aspect, the Venturi conduit (5) comprises at least one, preferably a plurality of, fluid driving elements (5*d*) arranged downstream the first inlet (5*a*) and/or downstream the second inlet (5*b*), said fluid driving elements (5*d*) being configured to keep a laminar and/or non-whirling fluid flow.

According to a further non-limiting aspect, the fluid driving elements (5*d*) extend parallel one another and/or have at least a side contacting the inner wall of the Venturi conduit (5).

According to a further non-limiting aspect, the fluid driving elements (5*d*) radially develop from an inner wall of the Venturi conduit (5).

According to a further non-limiting aspect, the fluid driving elements (5*d*) have a main development extension parallel to the longitudinal rotation axis (X).

According to a further non-limiting aspect, the Venturi conduit (5) comprises a flow return preventing element (5*v*), arranged substantially in correspondence of the second inlet (5*b*), optionally the flow return preventing element (5*v*) having a plurality of sheet elements overall defining a substantially helical or vortex shape.

According to a further non-limiting aspect, the flow return preventing element (5*v*) substantially protrudes outwardly the second inlet (5*b*).

According to a further non-limiting aspect, the central distributor (7) comprises an inner cavity and a flow directing surface (7*d*) protruding inwardly, optionally centrally, in the inner cavity; said flow directing surface (7*d*) being configured to assist the re-direction of the fluid coming from the inlet opening (7*a*) to the plurality of outlets (7*b*) along a curved path.

According to a further non-limiting aspect, the flow directing surface (7*d*) is a domed or pointed surface.

According to a further non-limiting aspect, the flow directing surface (7*d*) is provided with an apex point, optionally at a lower portion thereof.

According to a further non-limiting aspect, the flow directing surface (7*d*) is substantially a solid of revolution, optionally realized on a revolution axis coinciding with the rotation axis (X) of the main rotation shaft (2).

According to a further non-limiting aspect, the flow directing surface (7*d*) has a lateral shape laying on a straight line and/or assumes the shape of a cone or truncated cone.

According to a further non-limiting aspect, the flow directing surface (7*d*) has a curved lateral shape.

According to a further non-limiting aspect, said curved lateral shape at least mainly extends without non-differentiable points, and/or has a derivative decreasing in absolute value while moving from a portion of said flow directing surface (7*d*) with a greater cross-section to a portion of said flow directing surface (7*d*) with a lower cross-section.

According to a further non-limiting aspect, the plurality of outlets (7*b*) and the inlet opening (7*a*) communicate with said inner cavity.

According to a further non-limiting aspect, the central distributor (7) is realized as a single piece, or integral, element.

According to a further non-limiting aspect, the central distributor (7) comprises at least a first portion (7'), carrying the flow directing surface (7*d*), and a second portion (7"), carrying the lateral wall housing the inlet opening (7*a*) and the plurality of outlets (7*b*).

According to a further non-limiting aspect, the first portion (7') is arranged substantially at the top of the central distributor (7) and/or is a top closing portion of the central distributor (7).

According to a further non-limiting aspect, the first portion (7') is removably connected to the second portion (7") by means of a plurality of connection elements, said connection elements optionally comprising screws.

According to a further non-limiting aspect, the first portion (7') comprises a flanged portion (**7*f*) configured for allowing the connection with the second portion (7"**).

According to a further non-limiting aspect, the second portion (7") comprises a coupling portion, provided with holes (**7*w'***) configured to house at least partially the connection elements.

According to a further non-limiting aspect, the flanged portion (**7*f*) is provided with a plurality of holes (7*w*); the holes (7*w*) of the flanged portion (7*f*) being arranged in such a way to match corresponding holes (7*w'*) arranged in the coupling portion of the second portion (7"**).

According to a further non-limiting aspect, the coupling portion of the second portion (7") is substantially planar.

According to a further non-limiting aspect, the holes of the first portion (7') have respective axes which are parallel to the longitudinal rotation axis (X).

According to a further non-limiting aspect, the holes of the second portion (7") have respective axes which are parallel to the longitudinal rotation axis (X).

According to a further non-limiting aspect, the fluid turbine assembly (1) comprises a torque sensing device (70), said torque sensing device (70) being configured to sense the torque on the main rotation shaft (2).

According to a further non-limiting aspect, the torque sensing device (70) is installed co-axially with the main rotation shaft (2).

According to a further non-limiting aspect, the fluid turbine assembly (1) further comprises a supporting frame (50) configured to sustain at least said main rotor (3) and/or said main rotation shaft (2) at a predetermined height.

According to a further non-limiting aspect, the supporting frame (50) comprises at least one supporting plate (**50*p*) and at least one leg (501) connected to said supporting plate (50*p*), optionally a plurality of legs (501) connected to said supporting plate (50*p***).

According to a further non-limiting aspect, the at least one leg (501) is rigidly connected to said supporting plate (**50*p*), optionally the plurality of legs (501) being rigidly connected to said supporting plate (50*p***).

According to a further non-limiting aspect, said supporting plate (**50*p*) is arranged on a plane substantially parallel, optionally coinciding, with the plane on which the main rotor (3**) is configured to rotate.

Actuation Method

According to the present disclosure, it is disclosed a method of actuation of a fluid turbine, optionally a fluid turbine assembly (1) according to one or more of the aspects herein disclosed, the method comprising:

a step of making a main rotor (3) comprising a central portion and an outer portion, the main rotor (3) being installed on a main rotation shaft (2) configured to rotate around a longitudinal rotation axis (X), in such a way to bring the main rotation shaft (2) in rotation with the main rotor (3), to rotate by providing fluid to the main rotor (3) from an inlet assembly (4) for fluid;

a step of providing fluid to the inlet assembly (4), in such a way that the inlet assembly (4) drives, in use, fluid to the main rotor (3), the step of providing fluid comprising feeding the fluid to a Venturi conduit (5) of the inlet assembly (4) by feeding a first inlet (**5*a*) with a pressurized primary fluid source, and by feeding a second inlet (5*b*) with fluid dragged from a secondary fluid source (6) in such a way that the fluid dragged from the secondary fluid source (6) by the second inlet (5*b*) can be driven to the rotor (3) under the dragging effect caused by the fluid flowing in said first inlet (5*a***).

According to a further non-limiting aspect, the step of feeding the fluid to a Venturi conduit (5) by submersing the Venturi conduit (5) in the fluid, is such that at least the second inlet (**5*b*) lies below a fluid level of said secondary fluid source (6) and/or is such that the second inlet (5*b*) drags only fluid from said secondary fluid source (6**).

According to a further non-limiting aspect, the step of feeding the fluid to a Venturi conduit (5) by submersing the Venturi conduit (5) in the fluid, is such that at least the first inlet (**5*a*) lies below a fluid level of said pressurized primary fluid source and/or is such that the first inlet (5*a***) drags only fluid from said pressurized primary fluid source.

According to a further non-limiting aspect, the method comprises filling and/or keeping filled the secondary fluid source (6) with fluid, in such a way that the fluid contained in the secondary fluid source (6) reaches at least the second inlet (**5*b*), optionally the second inlet (5*b*) and the first inlet (5*a***).

According to a further non-limiting aspect, feeding the first inlet (**5*a*) with the pressurized primary water source is a step of feeding the first inlet (5*a***) by a fluid reservoir and/or by at least part of a penstock fed by a fluid reservoir.

According to a further non-limiting aspect, feeding the first inlet (**5*a*) comprises feeding said inlet (5*a*) with a fluid coming from a water source arranged at an altitude higher than the altitude at which the fluid turbine assembly (1**) is installed.

According to a further non-limiting aspect, feeding the first inlet (**5*a***) comprises feeding said inlet with a fluid flowing in a penstock, wherein the penstock is fed by said pressurized primary water source and/or constitutes at least part and/or acts as a pressurized primary water source.

According to a further non-limiting aspect, the method comprises discharging the fluid provided to the main rotor (3) through the inlet assembly (4) in said secondary fluid source (6).

According to a further non-limiting aspect, the method comprises at least partially re-using the fluid discharged by the main rotor (3) for feeding the second inlet (**5*b*) with the fluid discharged by the main rotor (3), optionally for feeding the second inlet (5*b*) with the fluid discharged by the main rotor (3) in said secondary fluid source (6**).

According to a further non-limiting aspect, the method comprises aligning substantially the Venturi conduit (5) with the main rotation shaft (2), in particular axially aligning substantially the Venturi conduit (5) with the main rotation shaft (2).

According to a further non-limiting aspect, the second inlet (**5*b*) annularly surrounds at least a part of the first inlet (5*a***) and/or has a funnel-type shape.

According to a further non-limiting aspect, feeding the fluid to the Venturi conduit (5) comprises drawing fluid from around, in particular perimetrally around, at least one portion of the first inlet (**5*a***).

According to a further non-limiting aspect, aligning substantially the Venturi conduit (5) with the main rotation shaft (2) causes the first inlet (**5*a*) to be substantially aligned, in particular to be substantially axially aligned, to the main rotation shaft (2**).

According to a further non-limiting aspect, feeding the fluid to the Venturi conduit (5) causes feeding an outlet (**5*u*) of the Venturi conduit (5) by means of, and with fluid coming from, the first and the second inlet (5*a*, 5*b***).

According to a further non-limiting aspect, the step of providing fluid to the inlet assembly (4) causes the step of making a main rotor (3) rotate by feeding said main rotor (3) centrally and/or from the central portion thereof.

According to a further non-limiting aspect, the main rotor (3) comprises a plurality of hollow arms (3*a*) at least partially arranged along a radial direction, said plurality of hollow arms (3*a*) realizing a plurality of fluid distribution conduits, and providing fluid to the main rotor (3) by means of the inlet assembly (4) causes distributing fluid from the central portion of the main rotor (3) to the outer portion of the main rotor (3) by means of the plurality of hollow arms (3*a*).

According to a further non-limiting aspect, providing fluid to the main rotor (3) by means of the inlet assembly (4) causes a uniform distribution of fluid along a plurality of directions through said hollow arms (3*a*), each direction being associated to at least one of said hollow arms (3*a*).

According to a further non-limiting aspect, the rotation of the main rotor (3) around said longitudinal rotation axis (X) causes a distribution of fluid realized at least partially by means of a centrifugal force exerted on the fluid by the rotation of the main rotor (3), in particular by the rotation of the plurality of hollow arms (3*a*) of the main rotor (3).

According to a further non-limiting aspect, said rotation causes a fluid drawing from the central portion of the main rotor (3) to the outer portion of the main rotor (3) and, optionally, from said Venturi conduit (5).

According to a further non-limiting aspect, the distribution of fluid from the central portion of the main rotor (3) to the outer portion of the main rotor (3) by means of the plurality of hollow arms (3*a*) comprises directing fluid to a predetermined direction to cause the rotation of the main rotor (3) by means of a reaction force, said predetermined direction being a direction substantially inclined with respect to a radial direction and to said longitudinal rotation axis (X) and being a direction along which is arranged each distal portion (3*d*) of each arm of the plurality of hollow arms (3*a*), said distal portion being arranged outside a central portion of each arm of the plurality of hollow arms (3*a*).

According to a further non-limiting aspect, the method comprises increasing an outlet fluid flow speed (s) for the fluid exiting the main rotor (3) by making the fluid pass through a distal portion (3*d*) having a cross-section of a first size, the central portion having a cross-section of a second size, the first size being smaller than the second size.

According to a further non-limiting aspect, the method comprises making the fluid exit from at least one outlet nozzle of the main rotor (3), the distal portion of each hollow arm (3*a*) constituting an outlet nozzle.

According to a further non-limiting aspect, the method comprises making the fluid exit from said distal portion (3*d*) causing the main rotor (3) to rotate in a direction which is opposite to a backward direction along which the distal portion (3*d*) is aligned.

According to a further non-limiting aspect, the main rotor (3) comprises a central distributor (7) comprising an inlet opening (7*a*) and a plurality of outlets (7*b*) connected in a fluid-tight connection each with a respective arm of said plurality of hollow arms (3*a*) and providing fluid to the main rotor (3) causes feeding the inlet opening (7*a*) of the central distributor (7) and a redirection of the fluid provided to the main rotor (3) from an axial direction associated to the inlet opening (7*a*) to a plurality of substantially radial directions associated to the plurality of outlets (7*b*), wherein the axial direction is substantially parallel to the direction of the longitudinal rotation axis (X).

According to a further non-limiting aspect, the feeding of the inlet opening (7*a*) of the central distributor (7) is provided by the outlet (5*u*) of the Venturi conduit (5), optionally is directly provided by the outlet (5*u*) of the Venturi conduit (5).

According to a further non-limiting aspect, the method comprises rigidly connecting the central distributor (7) to the plurality of hollow arms (3*a*).

According to a further non-limiting aspect, the method comprises a step of making a secondary rotor (10) of the fluid turbine assembly (1) rotate by feeding the secondary rotor (10) with fluid coming from the main rotor (3).

According to a further non-limiting aspect, the method comprises a step of discharging the fluid used for feeding the secondary rotor (10) into the secondary fluid source (6), and optionally comprises a step of discharging the fluid used for feeding the secondary rotor (10) directly into the secondary fluid source (6).

According to a further non-limiting aspect, the method comprises putting in rotation an auxiliary rotation shaft (2*x*) operatively coupled to said secondary rotor (10).

According to a further non-limiting aspect, putting in rotation the auxiliary rotation shaft (2*x*) implies making said auxiliary rotation shaft (2*x*) rotate around an axis which is parallel to said longitudinal rotation axis (X).

According to a further non-limiting aspect, putting in rotation the auxiliary rotation shaft (2*x*) implies making said auxiliary rotation shaft (2*x*) rotate co-axially with the main rotation shaft (2), said auxiliary rotation shaft (2*x*) being hollow and comprising a through hole configured to house part of the main rotation shaft (2).

According to a further non-limiting aspect, the method comprises aligning axially the through hole with the longitudinal rotation axis (X).

According to a further non-limiting aspect, the step of making a secondary rotor (10) of the fluid turbine assembly (1) rotate causes the secondary rotor (10), being an annular rotor laying outside the main rotor (3), to rotate outside the main rotor (3).

According to a further non-limiting aspect, the step of making a secondary rotor (10) of the fluid turbine assembly (1) rotate causes a rotation of the secondary rotor (10) on a rotation axis which is centered on said longitudinal rotation axis (X).

According to a further non-limiting aspect, the step of making a secondary rotor (10) of the fluid turbine assembly (1) rotate causes a rotation of the secondary rotor (10) on a substantially same plane on which the main rotor (3) lays.

According to a further non-limiting aspect, the step of making a secondary rotor (10) of the fluid turbine assembly (1) rotate causes a rotation of the secondary rotor (10) at least partially co-planarly with the main rotor (3).

According to a further non-limiting aspect, the step of making the secondary rotor (10) rotate comprises making the secondary rotor (10) rotate freely from the main rotor (3) and/or with respect to the main rotor (3).

According to a further non-limiting aspect, the step of making a secondary rotor (10) of the fluid turbine assembly (1) rotate by feeding the secondary rotor (10) with fluid coming from the main rotor (3) is a step of making a secondary rotor (10) of the fluid turbine assembly (1) rotate by feeding the secondary rotor (10) with fluid flowing from the plurality of hollow arms (3*a*) of the main rotor (3).

According to a further non-limiting aspect, the step of making a secondary rotor (10) of the fluid turbine assembly (1) rotate causes the fluid coming from the main rotor (3), optionally flowing from the plurality of hollow arms (3*a*) of the main rotor (3), to strike a plurality of blades (10*b*) of the secondary rotor (10), each blade of the plurality of blades (10*b*) defining a striking surface for the fluid coming from the main rotor (3), optionally for the fluid flowing, in use, from the plurality of hollow arms (3*a*). According to a further non-limiting aspect, the fluid that strikes the plurality of blades (10*b*) strikes against a striking surface (10*s*) that defines a substantially curved wall extending mainly on a plane which is substantially orthogonal to the rotation plane of the secondary rotor (10) and is deviated along a substantially curved path at least partially extending radially with respect to the longitudinal rotation axis (X).

According to a further non-limiting aspect, the step of making a secondary rotor (10) of the fluid turbine assembly (1) rotate causes said secondary rotor (10) to rotate in a direction which is opposite to the direction of rotation of the main rotor (3), due to a force that the fluid coming, in use, from the main rotor (3), optionally flowing, in use, from the plurality of hollow arms (3*a*) causes on the plurality of blades (10*b*), optionally on the striking surface (10*s*) of the plurality of blades (10*b*).

According to a further non-limiting aspect, the step of making a secondary rotor (10) of the fluid turbine assembly (1) rotate implies making said secondary rotor (10) rotate independently and/or freely from the main rotor (3).

According to a further non-limiting aspect, the method comprises a step of transferring torque from the main rotation shaft (2) and/or from the main rotor (3), to a first generator (20) in turn connected to the main rotation shaft (2) and/or to the main rotor (3).

According to a further non-limiting aspect, the method comprises a step of transferring torque from the auxiliary rotation shaft (2*x*) and/or from the secondary rotor (10), to a second generator (30) in turn connected to the auxiliary rotation shaft (2*x*) and/or to the secondary rotor (10).

According to a further non-limiting aspect, feeding the first inlet (5*a*) with a pressurized primary fluid source causes fluid to increase its speed by passing into a tapered portion of the first inlet (5*a*) of the Venturi conduit (5), wherein the tapered portion comprises an inner cross-section of a progressively reduced size when getting closer to an end thereof.

According to a further non-limiting aspect, the step of transferring torque from the main rotation shaft (2) and/or from the main rotor (3), to a first generator (20) in turn connected to the main rotation shaft (2) and/or to the main rotor (3), is a step wherein torque is transferred co-axially from the main rotation shaft (2) to the first generator (20).

According to a further non-limiting aspect, the step of distributing fluid from the central portion of the main rotor (3) to the outer portion of the main rotor (3) by means of the plurality of hollow arms (3*a*) implies distributing fluid along a direction that is inclined, in particular inclined upwardly, with respect to the plane on which the main rotor (3) rotates, and/or along a direction which is not orthogonal with respect to said longitudinal rotation axis (X).

According to a further non-limiting aspect, the method comprises redirecting the fluid entering in the central distributor (7) through its inlet opening (7*a*) to the plurality of outlets (7*b*) through a flow directing surface (7*d*) of the central distributor (7), said flow directing surface (7*d*) protruding inwardly, optionally centrally, in the inner cavity of the central distributor (7).

According to a further non-limiting aspect, redirecting the fluid entering in the central distributor (7) through its inlet opening (7*a*) to the plurality of outlets (7*b*) through a flow directing surface (7*d*) comprises redirecting the flow of the fluid entering the central distributor (7) along a curved path.

According to a further non-limiting aspect, redirecting the fluid entering in the central distributor (7) comprises making said fluid flow at least partially in substantial contact with a domed or pointed surface of the flow directing surface (7*d*).

According to a further non-limiting aspect, redirecting the fluid entering in the central distributor (7) comprises making said fluid at least partially enter into contact with an apex point of the flow directing surface (7*d*).

According to a further non-limiting aspect, redirecting the fluid entering in the central distributor (7) comprises making said fluid flow at least partially in substantial contact with the flow directing surface (7*d*) being a solid of revolution, optionally realized on a revolution axis coinciding with the rotation axis (X) of the main rotation shaft (2).

According to a further non-limiting aspect, redirecting the fluid entering in the central distributor (7) comprises making said fluid at least partially enter into contact with a wall of the flow directing surface (7*d*) having a shape laying on a straight line and/or assuming the shape of a cone or truncated cone.

According to a further non-limiting aspect, redirecting the fluid entering in the central distributor (7) comprises making said fluid at least partially enter into contact with a wall of the flow directing surface (7*d*) having a curved lateral shape.

According to a further non-limiting aspect, the method comprises arranging at least the main rotor (3) and/or said main rotation shaft (2) at a predetermined height from a bottom plane by sustaining at least said main rotor (3) and/or said main rotation shaft (2) at a predetermined height from said bottom plane.

According to a further non-limiting aspect, arranging at least the main rotor (3) and/or the main rotation shaft (2) at a predetermined height from said bottom plane comprises connecting at least the main rotor (3) and/or the main rotation shaft (2) to a supporting frame (50), said supporting frame (50) comprising at least one supporting plate (50*p*) and at least one leg (501) connected to said supporting plate (50*p*), optionally a plurality of legs (501) connected to said supporting plate (50*p*).

According to a further non-limiting aspect, feeding the fluid to the Venturi conduit (5) comprises making said fluid flow through at least one, preferably a plurality of, fluid driving elements (5*d*) arranged downstream the first inlet (5*a*) and/or downstream the second inlet (5*b*), said fluid driving elements (5*d*) being configured to keep a laminar and/or non-whirling fluid flow, the fluid driving elements (5*d*) being optionally arranged parallel to the longitudinal rotation axis (X).

According to a further non-limiting aspect, feeding the fluid to the Venturi conduit (5) comprises making said fluid flow through at least one, preferably a plurality of, fluid driving elements (5*d*) which extend parallel one another and/or have at least a side contacting the inner wall of the Venturi conduit (5).

According to a further non-limiting aspect, feeding the fluid to the Venturi conduit (5) comprises making said fluid flow through a flow return preventing element (5*v*), arranged substantially in correspondence of the second inlet (5*b*), optionally the flow return preventing element (5*v*) having a plurality of sheet elements overall defining a substantially helical or vortex shape.

Hydroelectric Power Plant

The present disclosure further concerns a hydroelectric power plant, comprising at least a fluid reservoir, a penstock connected to the fluid reservoir, a draining pool for collecting water extracted from the fluid reservoir through the penstock, wherein the hydroelectric power plant comprises a fluid turbine assembly (1) according to one or more of the aspects herein described.

According to a further non-limiting aspect, the assembly formed by the fluid reservoir and the penstock realizes the pressurized primary fluid source and the draining pool realizes the secondary fluid source.

FIGURES

Some particular and non-limiting embodiments of the fluid turbine here disclosed are presented in the following detailed description. The detailed description makes reference to the annexed figures, a brief description thereof being hereinafter provided.

FIG. 4 further shows a main rotor of the turbine and a secondary rotor, laying outside the main rotor and fed in use by the main rotor.

FIG. 6 shows a perspective view of a central distributor and of a main rotor of the fluid turbine according to the present disclosure.

FIG. 7 shows a perspective view of a detail of an end portion of a hollow arm of the main rotor, realizing a nozzle for making in use fluid strike a striking surface of a plurality of blades being part of a further rotor laying outside the main rotor.

FIG. 9 shows a section of a specific, optional embodiment for the inlet assembly.

FIG. 10 shows a section view of the optional embodiment of the inlet assembly, the section view being taken on a plane orthogonal to a longitudinal rotation axis X of the device shown in FIG. 9.

FIG. 11 shows a perspective partial section of a central distributor of the fluid turbine assembly, in an embodiment wherein said central distributor is divided in a first and a second portion connected together.

DETAILED DESCRIPTION

Figure 1:
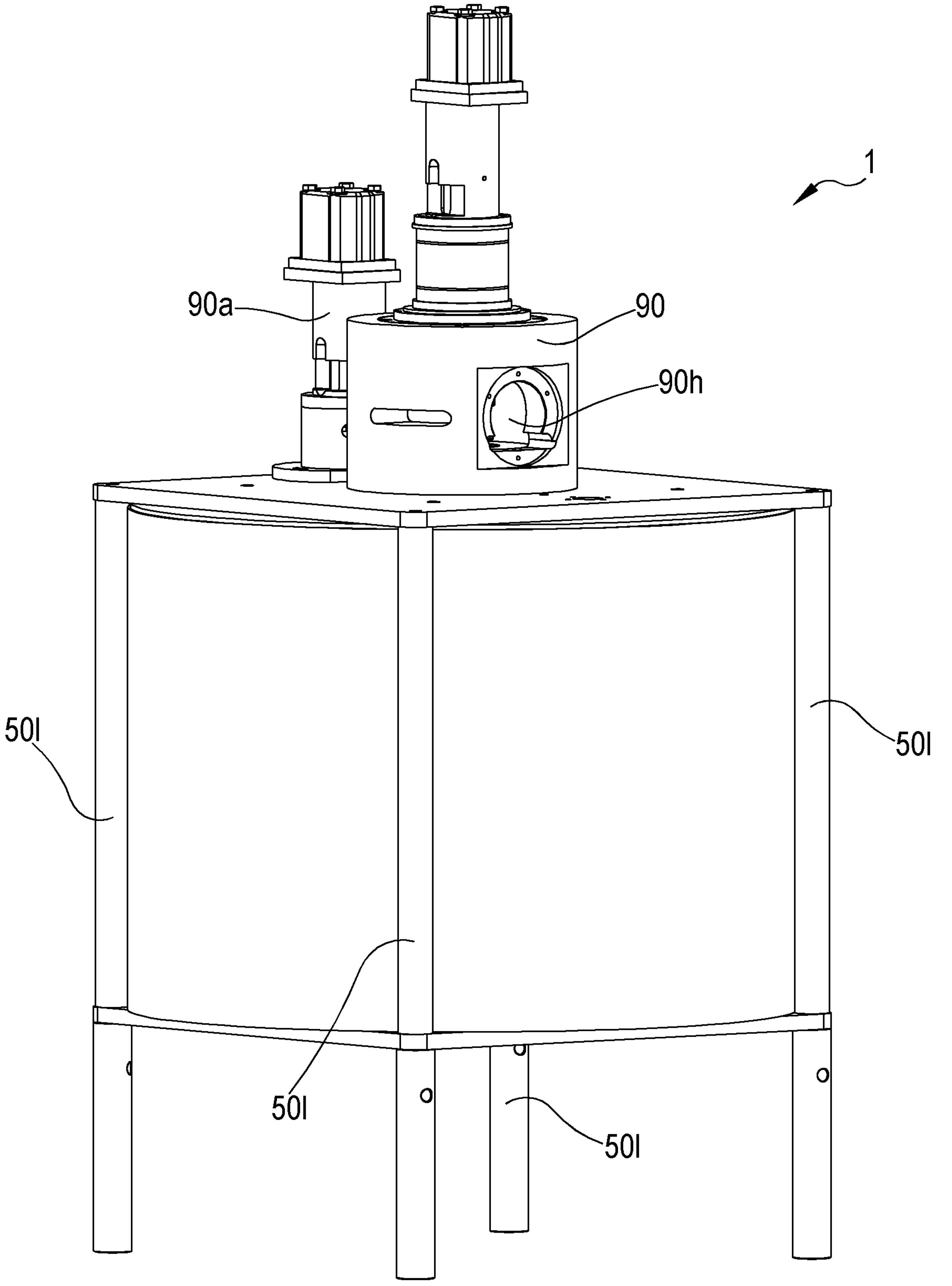
FIG. 1 shows a perspective view of a fluid turbine according to the present disclosure.
Figure 2:
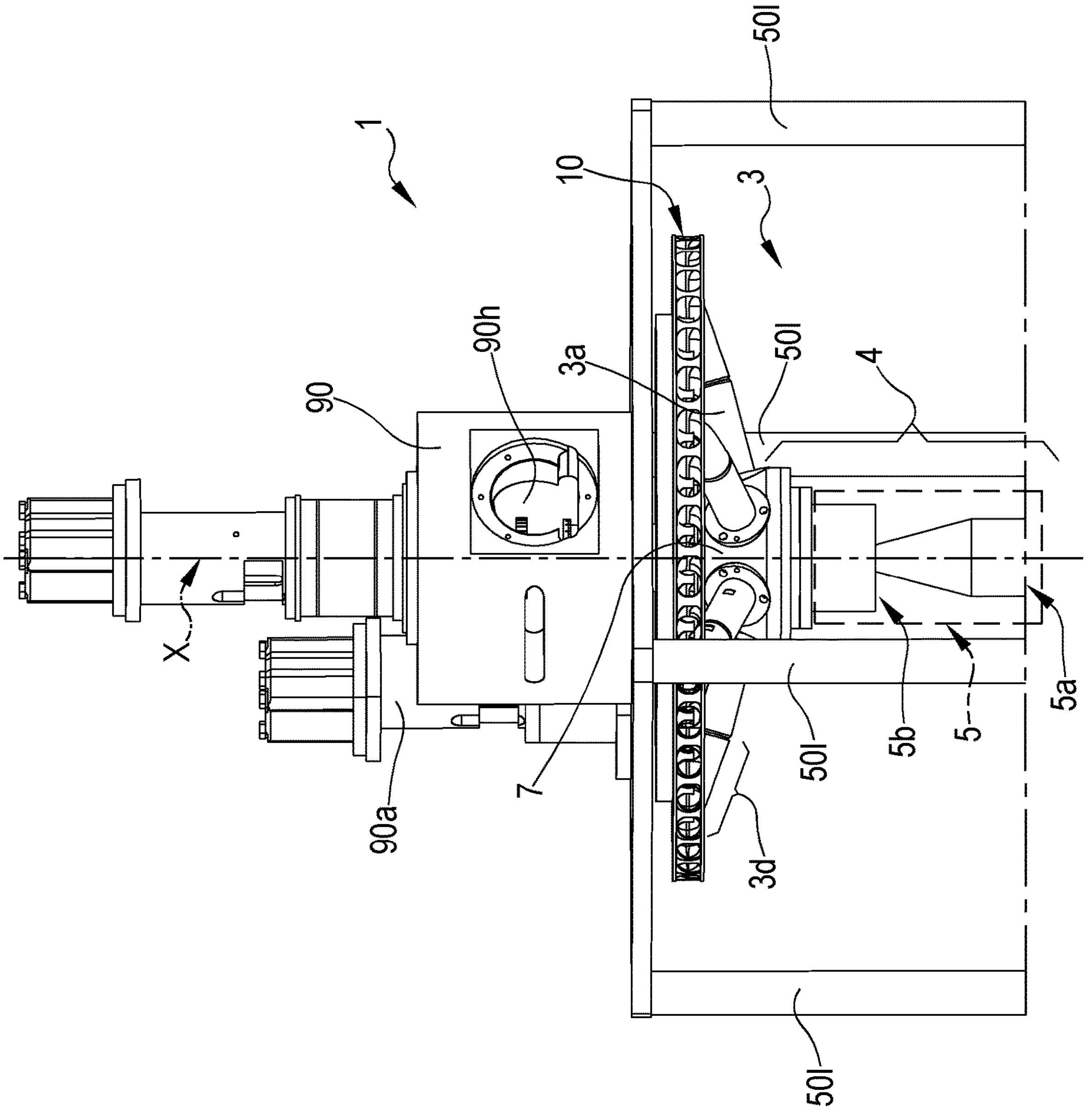
FIG. 2 shows a perspective view of a fluid turbine according to the present disclosure, without a protective case, in order to allow the reader to see the components laying into the protective case.

In FIG. 1, reference number 1 identifies a fluid turbine assembly.

The fluid turbine assembly 1 comprises a protective case, identified by the reference number 1*c*, which in a preferred and non-limiting embodiment is substantially tubular with circular cross-section. The fluid turbine assembly 1, as it will be described more in detail hereinafter, is configured to be at least partially submerged in a fluid, and thus the protective case 1*c* is at least partially submerged once the turbine is operative. In a preferred, albeit non-limiting, embodiment, the fluid herein described is water, or comprises water. Nonetheless, it shall be intended that the fluid may comprise a gas, which is known to be a fluid without an own defined volume and which is compressible.

The fluid turbine assembly 1 according to the present disclosure at least comprises a main rotation shaft 2, rotating around a longitudinal rotation axis X, which in the annexed figures, and in a real construction, is arranged substantially vertically.

The fluid turbine assembly 1 further comprises a main rotor 3; the main rotor 3 comprises a central portion and an outer portion, and is installed on the main rotation shaft 2 in such a way to bring the main rotation shaft 2 in rotation with the main rotor 3. In particular, it is noted that the main rotor 3 is fixed on the main rotation shaft 2 in such a way to solidly rotate therewith. The outer portion of the main rotor 3 circumscribes a diameter which is significantly greater than the diameter which circumscribes the central portion of the main rotor 3. Preferably, the main rotor 3 rotates on a plane which is substantially horizontal.

The fluid turbine 1 herein disclosed may be configured to lay into a secondary fluid source tank, and for this purpose may be provided with a plurality of supporting legs 501. The legs 501, in a preferred and non-limiting embodiment, are four and are arranged at a predetermined distance from the longitudinal rotation axis in order to provide suitable stability for the fluid turbine assembly 1.

In one embodiment, that is the embodiment shown in the annexed figures, the fluid turbine assembly 1 further comprises a supporting frame 50 configured to sustain the main rotor 3 at a predetermined height from a bottom plane on which the fluid turbine assembly 1 is configured to stay. In an embodiment the supporting frame 50 comprises:

- at least a supporting plate 50*p*,
- at least one leg 501, preferably a plurality of legs 501.

The supporting plate 50*p* sustains at least the main rotor 3 and is arranged on a plane substantially parallel, optionally coinciding, with the plane on which the main rotor 3 rotates. The at least one leg 501 is rigidly fixed on the supporting plate 50*p*. In the embodiment shown in the annexed figures, there are four legs supporting the main rotor 3; clearly, the number of legs shall not be considered limiting.

A particular technical element of the fluid turbine assembly according to the present disclosure resides in an inlet assembly 4 for fluid, said inlet assembly 4 being configured to drive fluid to the main rotor 3. The inlet assembly 4 is contained in the protective case, at least partially.

Said inlet assembly 4 comprises a Venturi conduit 5 that in turn comprises:

- a first inlet 5*a* configured to be connected to, and to be fed in use with, a pressurized primary fluid source, and
- a second inlet 5*b* configured to be submerged into, and to drag fluid from, a secondary fluid source 6 to the rotor 3 under the dragging effect caused by the fluid flowing in said first inlet 5*a*.

In particular, the pressurized primary water source may be a pressurized water source. In an embodiment the pressurized water source may comprise a water reservoir arranged at an altitude higher than the altitude at which the fluid turbine assembly is arranged, and/or may comprise a penstock where, in use, water coming from a reservoir is made flow to the inlet assembly.

The secondary fluid source may be in particular a secondary water source a draining pool of an hydroelectric plant. Such draining pool is thus clearly fed, albeit indirectly, by the penstock. In an embodiment, thus, the second inlet 5*b* is configured to be fed by water discharged from at least the main rotor 3, and the main rotor 3 is configured to discharge the fluid, optionally water, in said secondary fluid source 6.

It is thus clear that the present disclosure further concerns a hydroelectric power plant, comprising at least a fluid reservoir, a penstock connected to the fluid reservoir, a draining pool for collecting water extracted from the fluid reservoir through the penstock, wherein the hydroelectric power plant comprises a fluid turbine assembly 1. The assembly formed by the fluid reservoir and the penstock realizes the pressurized primary fluid source and the draining pool realizes the secondary fluid source 6. The fluid reservoir is a natural or an artificial water reservoir (if the case may be provided or defined at least partially by means of a barrage) and the fluid reservoir is arranged at an altitude higher than the altitude at which the turbine assembly is substantially arranged. Preferably the turbine is arranged substantially at the height of the draining pool.

It is noted that the figures annexed to the present description refer to an embodiment wherein, in addition to the main rotor 3 also a secondary rotor 10 is present. It is noted that the presence of this secondary rotor 10 is not compulsory for the purposes of the present disclosure. Thus even if the following portion of the description will be referred to a specific embodiment of the disclosure having the secondary rotor 10, such technical element shall not be considered an essential feature of the disclosure. Preferably, the secondary rotor 10 is configured to rotate on a plane which is substantially horizontal. Thus the main rotor 3 and the secondary rotor 10 rotate on parallel planes or even on a same plane.

The inlet assembly 4 feeds the secondary rotor 10 indirectly: as it will be clearer by reading the following part of the description, the secondary rotor 10 is fed by the fluid provided by, and exiting from, the main rotor 3. Thus the actuation method herein disclosed comprises a step of making a secondary rotor 10 of the fluid turbine 1 rotate by feeding the secondary rotor 10 with fluid coming from the main rotor 3.

Thus, in general terms, a method of actuation of a fluid turbine assembly 1 comprises:

- a step of making a main rotor 3 comprising a central portion and an outer portion, the main rotor 3 being installed on a rotation shaft 2 rotating around a longitudinal rotation axis X, in such a way to bring the main rotation shaft 2 in rotation with the main rotor 3, rotate by providing fluid to the main rotor 3 from an inlet assembly 4 for fluid;
- a step of providing fluid to the inlet assembly 4, in such a way that the inlet assembly 4 drives, in use, fluid to the main rotor 3, the step of providing fluid comprising feeding the fluid to a Venturi conduit 5 of the inlet assembly 4 by feeding a first inlet 5*a* with a pressurized fluid source, and by feeding a second inlet 5*b* with fluid dragged from a secondary fluid source 6 in such a way that the fluid dragged from the secondary fluid source 6 by the second inlet 5*b* can be driven to the rotor 3 under the dragging effect caused by the fluid flowing in said first inlet 5*a*.

Coherently with the previous paragraphs, feeding the first inlet 5*a* with a pressurized fluid source may in particular comprise feeding the first inlet 5*a* with a pressurized water source and, more in detail, may comprise feeding the first inlet 5*a* with water coming from a water reservoir arranged at an altitude higher than the altitude at which the fluid turbine assembly is installed, and/or comprises feeding water to the first inlet 5*a* with a penstock where, in use, water coming from a reservoir is made flow.

As well, feeding the second inlet 5*b* with fluid dragged from a secondary fluid source 6 comprises feeding the second inlet 5*b* with water dragged from a secondary water source 6 that, in an embodiment, may be a draining pool of an hydroelectric plant.

It may be further noted that in use the fluid turbine assembly 1 herein described may be configured to discharge the fluid that has fed the main rotor 3 in the secondary fluid source. In particular, the fluid turbine assembly 1 may be configured to discharge the water that has fed the main rotor 3 in the secondary water source. Thus, the fluid turbine assembly 1 herein described may be advantageously configured to re-use at least partially the discharged fluid, in particular the discharged water, to the feed the Venturi conduit 5 at the second inlet 5*b*. This implies that the method of actuation of the fluid turbine assembly 1, in particular of actuation of the water turbine assembly 1, comprises re-using a discharged fluid, in particular a discharged water, used for feeding the main rotor 3, to feed the Venturi conduit 5 at the second inlet 5*b*.

In an embodiment, the aforementioned method comprises a step of discharging the fluid (in particular, the water) used for putting the main rotor 3 in rotation to the secondary fluid source 6, and comprises re-using at least part of the water discharged from the main rotor 3 to feed the second inlet 5*b*.

It is thus clear that the first inlet 5*a* is configured to be fed by a water reservoir, in particular by a water reservoir arranged at an altitude higher than the altitude at which the fluid turbine assembly is arranged, and/or is configured to be fed by a penstock where, in use, water coming from a reservoir is made flow to the first inlet 5*a* and that the second inlet 5*b* is configured to be fed by a draining pool, in particular by a draining pool of a hydroelectric plant.

Re-using part of the water used for putting the main rotor 3 in rotation helps saving water and thus makes the operation of the present turbine more ecologically friendly.

The Applicant has conceived a particular way of actuation for the fluid turbine assembly 1 by means of a Venturi conduit 5 that in use is substantially submersed. The Venturi conduit 5 is configured in such a way to be fed only by means of fluid, without dragging unwanted air. This means that the second inlet 5*b* lies below a fluid level of the secondary source 6 and/or this means that, in use, the second inlet drags only fluid from said secondary fluid source 6.

In any case, even if the first inlet 5*a* is fed by a pressurized primary fluid source, and thus there is less risk that such first inlet 5*a* drags unwanted air, it is preferable that this first inlet 5*a* only drags fluid from the pressurized primary fluid source. This may mean that also the first inlet 5*a* lies below the fluid level of the pressurized primary fluid source. This may further mean that the entire inlet assembly 4 may lies below the fluid level of the secondary fluid source 6.

The Applicant has discovered that such configuration helps in achieving a high level of efficiency for the fluid turbine herein disclosed.

The secondary fluid source tank constitutes a secondary fluid source 6 for the fluid turbine assembly 1, and such secondary fluid source is configured to feed fluid to the second inlet 5*b* of the venture conduit 5 by making fluid reach said second inlet 5*b*. Thus the actuation of the turbine assembly herein disclosed further comprises a step of providing fluid in or to the secondary fluid source 6, and in particular may comprise filling or keeping filled the secondary fluid source 6 with fluid in such a way that the fluid contained in the secondary fluid source 6 reaches at least the second inlet 5*b* and, preferably also the level of the first inlet 5*a*.

Albeit this specific feature is not to be considered as compulsory, as it may be noted from the annexed figures the Venturi conduit 5 is substantially aligned, in particular axially aligned, with the main rotation shaft 2. More in detail, the first inlet 5*a* is substantially aligned, in particular axially aligned, with the main rotation shaft 2. This allows to reduce the pressure drops when feeding the main rotor 3 with fluid.

The second inlet 5*b* annularly surrounds at least a part of the first inlet 5*a* and/or has a funnel-type shape; the funnel-type shape is configured to draw fluid from around, in particular perimetrally around, at least one portion of the first inlet 5*a*. This allows to have a uniform drawing of fluid from the entire surface surrounding the part of conduit which realizes the first inlet 5*a*. A grille may be present at the second inlet 5*b* in order to avoid that in use solid parts may be sucked into the Venturi conduit 5 and rest stuck therein or into the main rotor 3.

The Venturi conduit 5 comprises an outlet 5*u* fed in use by the first and the second inlet 5*a*, 5*b*. In use, substantially, the outlet 5*u* receives the fluid from the pressurized fluid source feeding the first inlet 5*a* and also receives the fluid which is drawn from the second inlet 5*b* due to the Venturi effect.

In use, thus, when the fluid turbine assembly 1 is operated, feeding the fluid to the Venturi conduit 5 causes a drawing fluid from around, in particular perimetrally around, at least one portion of the first inlet 5*a*, and such feeding the fluid to the Venturi conduit 5 causes feeding the outlet 5*u* of the Venturi conduit 5 by means of, and with fluid coming from, the first and the second inlet 5*a*, 5*b*.

In an embodiment, the first inlet 5*a* of the Venturi conduit 5 comprises a tapered portion comprising an inner cross-section of a progressively reduced size when getting closer to an end thereof. Feeding the first inlet 5*a* with a pressurized fluid source causes fluid to increase its speed (while reducing its pressure) by passing into the tapered portion of the first inlet 5*a* of the Venturi conduit 5.

The Applicant noticed that the effect of such Venturi conduit 5 significantly increases the efficiency of any turbine, even if in a type of a single rotor, and in particular increases the efficiency of a centrally fed, single or double rotor turbine, especially when the turbine is a reaction turbine.

Turning back to the disclosure of the main rotor 3, it may be noted that this latter is a centrally fed rotor, and this means that the inlet assembly 4 is configured to feed fluid to the main rotor 3 from the central portion thereof. The main rotor 3 thus spreads fluid to its external portion and this is due to a combination of effects: the pressure coming from the pressurized fluid source and/or from the auxiliary fluid source 6, and the drawing effect that the rotation of the main rotor 3 causes on the fluid therein present, that as it will be clearer from the following part of the description, draws fluid from the central portion of the main rotor 3 and leads it to exit from a plurality of nozzles arranged at a perimetral end of the plurality of hollow arms 3*a* of the main rotor 3.

For achieving the aforementioned technical effect, the main rotor 3 comprises a plurality of hollow arms 3*a* at least partially arranged along a radial direction. The radial direction is considered with respect to the longitudinal rotation axis X. The plurality of hollow arms 3*a* realizes a plurality of fluid distribution conduits configured to allow, in use, the distribution of fluid from the central portion of the main rotor 3 to the outer portion of the main rotor 3.

In other words, in use, the step of providing the fluid to the inlet assembly 4 causes the step of making the main rotor 3 rotate by feeding said main rotor 3 from the central portion thereof.

As the main rotor 3 comprises a plurality of hollow arms 3*a* at least partially arranged along a radial direction, said plurality of hollow arms 3*a* realizing a plurality of fluid distribution conduits, the provision of fluid to the main rotor 3 by means of the inlet assembly 4, and in particular through the Venturi conduit 5, causes distributing the fluid from the central portion of the main rotor 3 to the outer portion of the main rotor 3 by means of the plurality of hollow arms 3*a*, and this distribution is realized at least partially by means of a centrifugal force exerted on the fluid by the rotation of the main rotor 3, in particular by the rotation of the plurality of hollow arms 3*a* of the main rotor 3. This rotation thus causes a fluid drawing from the central portion of the main rotor 3 to the outer portion of the main rotor 3, and thus also from the Venturi conduit 5. Such drawing causes a depression at least in the second inlet 5*b* sufficient to win the difference in height from the second inlet 5*b* (or, thus, from the fluid level of the secondary fluid source 6) to the main rotor's height.

As it is clearly shown in the annexed figures, each arm of the plurality of hollow arms 3*a* comprises a central portion, and a distal portion 3*d* substantially positioned at the outer portion of the main rotor 3. The distal portion is arranged in a direction substantially inclined with respect to a radial direction and to the longitudinal rotation axis X, being configured to direct, in use, the fluid to a predetermined direction to cause the rotation of the main rotor 3 by means of a reaction force.

Preferably, albeit in a non-limiting extent, the plurality of hollow arms 3*a* is configured to distribute fluid uniformly along a plurality of directions, each direction being associated to at least one of said hollow arms 3*a*. Each direction of the plurality of directions is substantially inclined with respect to the direction along which the main rotation axis lies.

This means that each arm of such plurality of hollow arms 3*a* is provided with a same cross-section, optionally the same diameter, in such a way that such diameter allows a mass flow rate that is equivalent for each arm of the plurality of hollow arms 3*a*. It is noted that the hollow arms 3*a* are equally distributed along the 360° of the zenithal plane of the main rotor 3. The Applicant notices that the use of the wording "being associated to at least one of said hollow arms 3*a*" means that in at least one embodiment the main rotor 3 may have a plurality of superimposed hollow arms, e.g. a plurality of couples of superimposed hollow arms 3*a*, wherein each couple comprises two hollow arms which are configured to distribute fluid along a substantially same direction.

Thus in an embodiment the direction substantially inclined with respect to a radial direction that each distal portion 3*d* has, is arranged substantially on a plane of rotation of the main rotor 3 and the distal portion 3*d* is substantially oriented backwardly with respect to a direction of rotation of the main rotor 3.

As it may be noted by the annexed figures, in a preferred and non-limiting embodiment, the distal portion 3*d* has a cross-section of a first size and the central portion has a cross-section of a second size, the first size being smaller than the second size. The purpose of the reduction of the cross-section is allowing to increase an outlet fluid flow speed (s) for the fluid exiting the main rotor 3. This cross-section reduction thus cooperates with the centrifugal force of the rotation of the main rotor 3 to accelerate the fluid flow exiting from each of the hollow arms 3*a*.

It may be noted that preferably each of the hollow arms 3*a* has a circular cross-section, and thus the first size may actually be a first diameter and the second size may actually be a second diameter. The use of a circular conduit for realizing the hollow arms 3*a* is thus not compulsory and the represented shape of the hollow arms 3*a* shall not be considered as limiting.

The main rotor 3 comprises a central distributor 7 comprising an inlet opening 7*a* and a plurality of outlets 7*b* connected in a fluid-tight connection each with a respective arm of said plurality of hollow arms 3*a*. In detail, the inlet opening 7*a* is arranged at a bottom portion of the central distributor 7 and the plurality of outlets 7*b* is arranged at a height greater than the height at which, in use, the inlet opening 7*a* lies; the plurality of outlets 7*b* is arranged radially on a lateral wall of the central distributor.

In use, thus when fluid is provided to the main rotor 3, there is a feeding of the inlet opening 7*a* of the central distributor 7 and a redirection of the fluid provided to the main rotor 3 from an axial direction associated to the inlet opening 7*a* to a plurality of substantially radial directions associated to the plurality of outlets 7*b*; the axial direction is substantially parallel to the direction of the longitudinal rotation axis X.

Albeit this feature shall not be considered as limiting, the shape of the outlets 7*b* matches with the shape of cavity of the hollow arms 3*a*. In the annexed figures, since the hollow arms 3*a* have a circular cross-section, also the shape of the outlets 7*b* has a circular cross-section.

In a preferred, non-limiting, embodiment, the central distributor 7 is closed upwardly and is provided with a flow directing surface 7*d* which protrudes inwardly in the inner cavity 7*c* of the central distributor 7. This flow directing surface, when cut on any plane parallel to the longitudinal rotation axis X has the most protruding portion substantially aligned with the longitudinal rotation axis X, and if cut on a plane laying on the longitudinal rotation axis X underlines a cuspid-shaped profile centered on the longitudinal rotation axis X. In an embodiment the shape assumed by the section of the flow directing surface 7*d* may be substantially Gaussian-like. It results that—due to the presence of the flow directing surface 7*d*—the inner cavity of the central distributor 7 assumes a substantially annular shape.

Thus in use, when the fluid coming from the outlet 5*u* of the Venturi conduit 5 strikes the flow directing surface 7*d*, centrally strikes a substantially pointed profile wall that directs the fluid along a curved profile towards the outlets 7*b* of the central distributor 7. This again helps to reduce the pressure and speed drops of the fluid and thus helps in obtaining a high energy efficiency of the fluid turbine assembly 1.

The flow directing surface 7*d* may be a domed or a pointed surface; the flow directing surface 7*d* has a lower apex point that is centered on the rotation axis X. The flow directing surface 7*d* is substantially the surface of a solid of revolution, realized by means of a revolution along an axis coinciding with the rotation axis X.

In an embodiment, not shown in the annexed figures, the flow directing surface 7*d* has a lateral shape that lies on a straight line, and thus assumes the shape of a cone or truncated cone. In another embodiment, which is shown in the annexed figures, the flow directing surface 7*d* has a lateral shape which is curved, in particular mainly extending without non-differentiable points. The annexed figures show the solid of revolution that has cross-sections progressively reducing while moving along the rotation axis X from a higher to a lower height. The derivative of the curve defined by the lateral surface decreases in absolute value while moving from the portions with larger cross-section to the portion with smaller cross-section. In particular the aforementioned cross-section is the cross-section defined by the perimetrally outer wall of the flow directing surface 7*d*.

As shown in the annexed figures, the inlet opening 7*a* of the central distributor 7 is connected to the outlet 5*u* of the Venturi conduit 5, and according to the specific embodiment shown in the annexed figures is directly connected to the outlet 5*u* of the Venturi conduit 5.

In an embodiment, the central distributor 7 may be realized as a single piece, or integral, element.

In another embodiment, shown in the annexed figures, the central distributor 7 is realized in two pieces:

- a first portion 7', carrying the flow directing surface 7*d*, and
- a second portion 7", carrying the lateral walls housing the inlet opening 7*a* and the plurality of outlets 7*b*.

In the embodiment of the annexed figures, the first portion 7' is arranged substantially at the top of the central distributor 7 and thus realizes a top closing portion of the central distributor.

It is further noted that the first portion is removably connected to the second portion by means of a plurality of connection elements (not shown in the annexed figures). Those connection elements may comprise screws. For this purpose, the first portion 7' comprises a flanged portion 7*f* configured for allowing the connection with the second portion 7". The flanged portion 7*f* is provided with a plurality of holes 7*w* arranged at a predetermined distance one with respect to the other, and the holes of the flanged portion 7*f* are arranged in such a way to match holes 7*w'* arranged in a coupling portion 7*y* of the second portion. The coupling portion of the second portion is substantially planar. The holes 7*w* of the first portion 7' and of the second portion 7" have respective axes which are parallel to the longitudinal rotation axis X.

At its top, the first portion 7' comprises an annular recess 7*r*, axially aligned on the rotation axis X, which is limited, at its bottom, by a supporting wall arranged on a plane substantially orthogonal to the rotation axis X.

The supporting wall is provided with a plurality of holes configured to match with holes of a bottom plate 2*m* or flange of the main rotation shaft 2. The bottom plate 2*m* or flange extends on a plane which is substantially orthogonal to the direction defined by the rotation axis X. The bottom plate 2*m* or flange is provided with a bottom wall substantially planar which extends on a plane being substantially orthogonal to the direction defined by the rotation axis X.

The holes of the bottom plate 2*m* and of the supporting wall are axially aligned to the rotation axis X, and preferably are equally spaced along the entire azimuthal development of the supporting wall.

Once the main rotation shaft 2 is assembled to the first portion 7', the bottom wall of the bottom plate 2*m* or flange contacts the supporting wall of the recess 7*r* and connection elements, in particular screws or bolts are introduce in the holes of the bottom plate 2*m* to pass therein and to reach, and partially be introduced into, the holes present on the supporting wall.

Preferably, albeit in a non-limiting extent, the aforementioned holes are provided with a circular cross-section. This specific shape shall not be intended as limiting.

The central distributor 7 is rigidly connected with the plurality of hollow arms 3*a*; this rigid connection allows for realizing a very solid main rotor 3 structure.

In a preferred, and non-limiting, embodiment, the structure of the main rotor 3, and in particular of the central distributor 7 and of the hollow arms 3*a* is realized, in particular fully realized, in metal. This allows to have proper resistance to withstand the relevant forces that the fluid turbine assembly 1 of the present disclosure in use develops.

As already anticipated in the previous part of the description, a particular and non-limiting embodiment of the fluid turbine assembly 1 of the present disclosure further comprises a secondary rotor identified by the reference number 10 and being configured to be fed by the fluid coming from, and in particular sprayed by, the main rotor 3. The fluid turbine assembly 1 further comprises an auxiliary rotation shaft 2*x* which is operatively coupled to the secondary rotor 10 and put in rotation, in particular solidly, by means of this latter secondary rotor 10.

In a specific and non-limiting configuration, the main rotor 3 is configured to discharge fluid to the secondary fluid source 6 through the secondary rotor. This implies that is actually the secondary rotor 10 that, eventually, discharges the fluid used for its rotation to the secondary fluid source. It is thus clear that the method herein described comprises discharging the fluid used for putting the secondary rotor 10 in rotation in the secondary fluid source 6.

Figure 5:
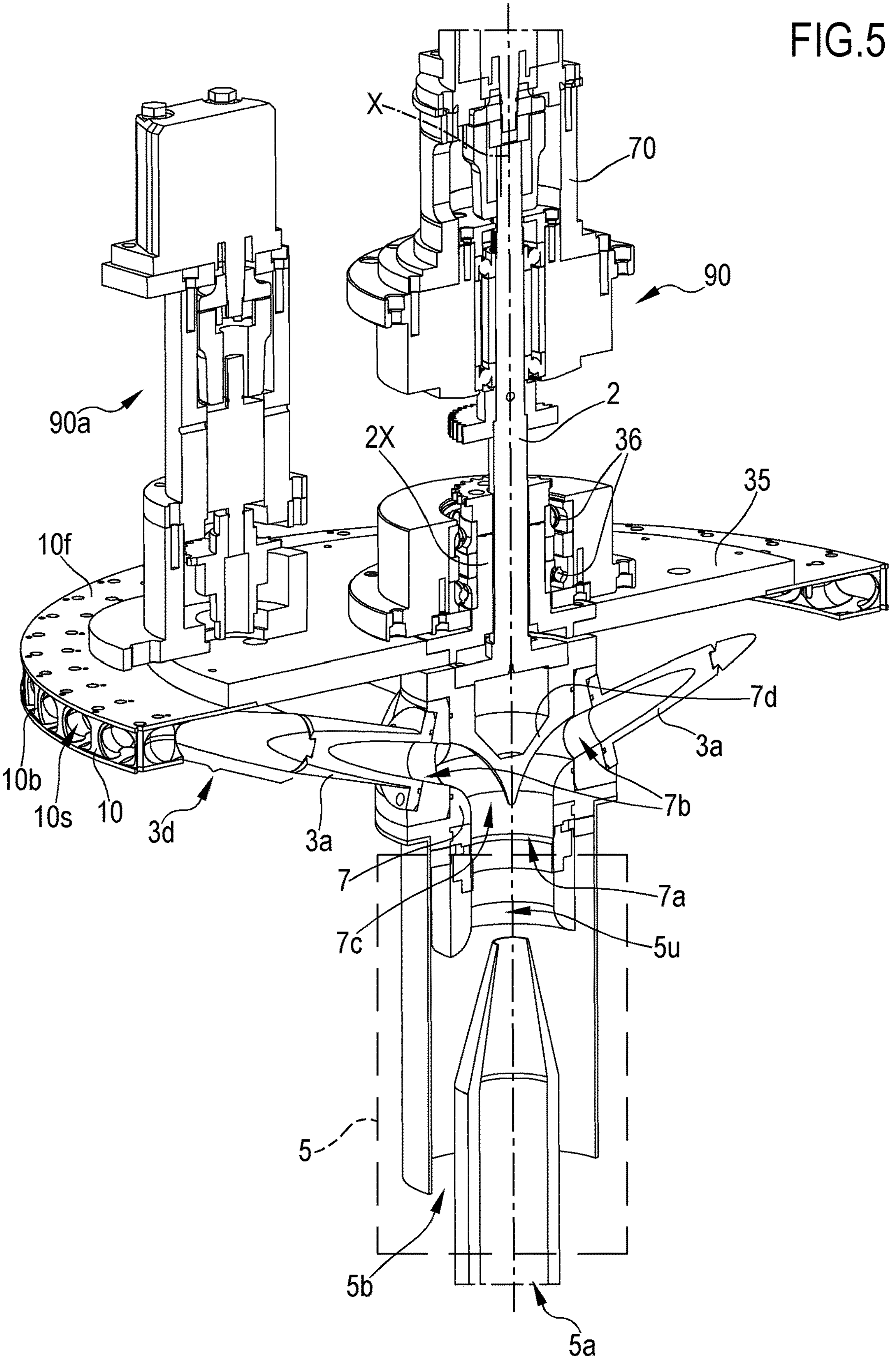
FIG. 5 shows a perspective partial section of part of the fluid turbine of the present disclosure.
Figure 8:
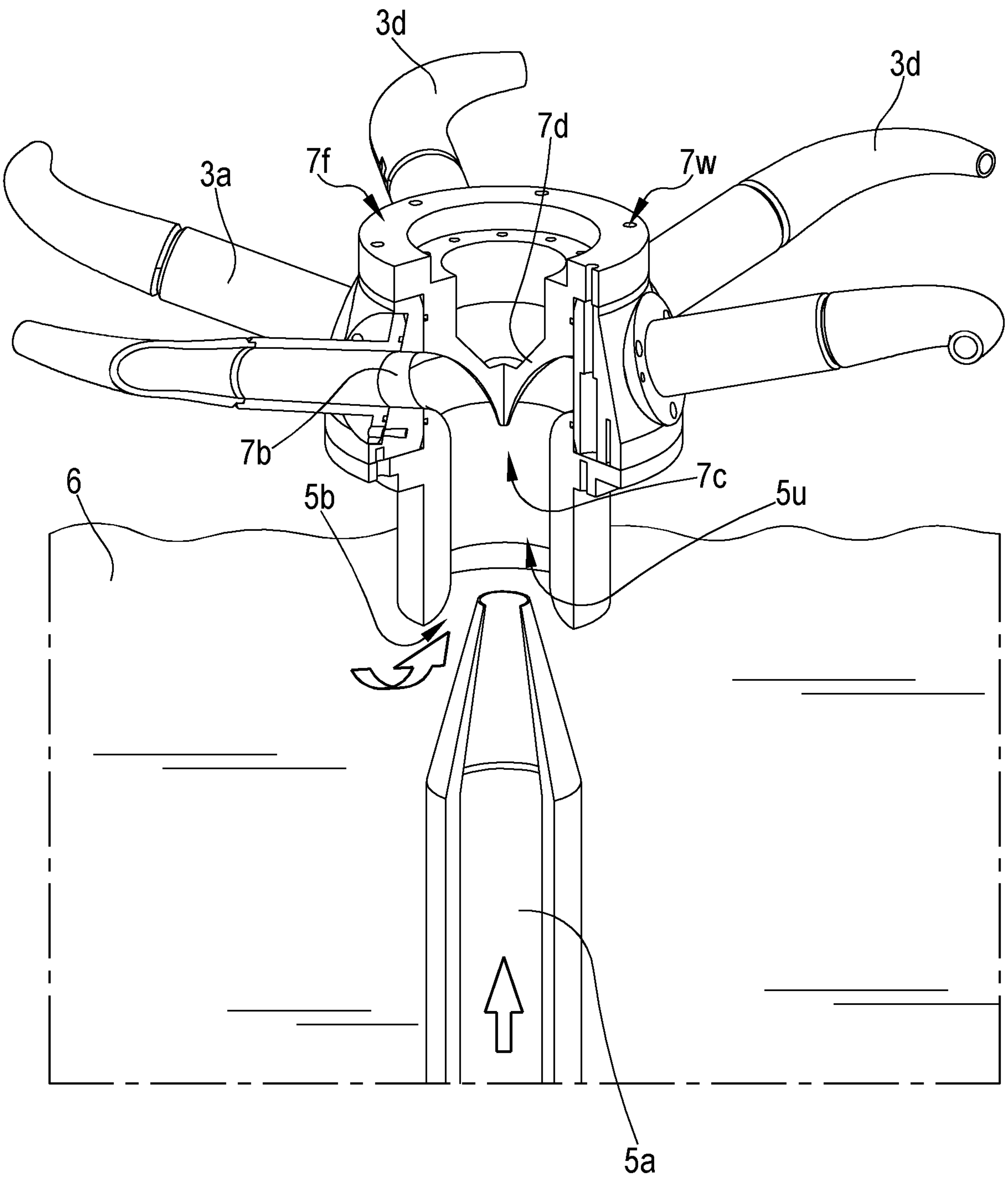
FIG. 8 shows a perspective partial section of the inlet assembly, central distributor and hollow arms of the main rotor.

As clearly shown e.g. in FIG. 5, the auxiliary rotation shaft 2*x* is coaxial with the main rotation shaft and is hollow. In detail, the auxiliary rotation shaft 2*x* comprises a through-hole, axially aligned with the auxiliary rotation shaft's 2*x* main extension direction, which is configured to house part of the main rotation shaft 2. The through hole is axially aligned with the longitudinal rotation axis X.

In use there may be a rotation of the main rotation shaft 2 with respect to the auxiliary rotation shaft 2*x*, that can freely rotate with respect to the first one.

As shown in the annexed figures, in an embodiment this secondary rotor 10 is annular and lays outside the main rotor 3. The two rotors 3, 10 rotate substantially co-planarly around a same axis which corresponds to the longitudinal rotation axis X of the main rotor 3. This means that the secondary rotor 10 is centered on said longitudinal rotation axis X. When fluid is fed to the main rotor 3, the fluid that exits the distal portion 3*d* of each of the hollow arms 3*a* is directed to the secondary rotor 10 and forces it to rotate.

It is thus clear that a specific and non-limiting embodiment of the actuation method above described further comprises putting in rotation an auxiliary rotation shaft 2*x* of the turbine, wherein the auxiliary rotation shaft 2*x* is operatively coupled, and in particular directly connected, to said secondary rotor 10. Putting in rotation the auxiliary rotation shaft 2*x* implies making the auxiliary rotation shaft 2*x* rotate around an axis which is parallel to said longitudinal rotation axis X.

This causes the secondary rotor 10, being an annular rotor laying outside the main rotor 3, to rotate outside the main rotor 3. More precisely, the step of making the secondary rotor 10 of the fluid turbine 1 rotate causes a rotation of the secondary rotor 10 on a rotation axis which is centered on the longitudinal rotation axis X and, in the specific embodiment shown in the annexed figures, causes a rotation of the secondary rotor 10 on a substantially same plane on which the main rotor 3 lays. Albeit this shall not be considered in a limiting way, the step of making a secondary rotor 10 of the fluid turbine 1 rotate causes a rotation of the secondary rotor 10 at least partially co-planarly with the main rotor 3.

The secondary rotor 10 comprises a plurality of blades 10*b* defining, each one, a striking surface 10*s* for the fluid coming, in use, from the main rotor 3 and in particular for the fluid flowing, in use, from the plurality of hollow arms 3*a*. This means that in use when the secondary rotor 10 is made to rotate by means of the fluid coming from the main rotor 3, this fluid strikes the blades 10*b* of the secondary rotor by hitting the striking surface and is hence subsequently redirected therefrom.

Albeit the striking surface 10*s* may assume several shapes, in a preferred and non-limiting embodiment the striking surface 10*s* defines a substantially curved wall extending mainly on a plane which is substantially orthogonal to the rotation plane of the secondary rotor 10 and is configured to deviate a fluid flow along a substantially curved path at least partially extending radially with respect to the longitudinal rotation axis X. This shall not be considered as limiting, as in another embodiment (not shown in the annexed figures), the striking surface 10*s* may assume a substantially planar shape. An outer portion 10*p* of each of the blades is arranged substantially orthogonally with respect to the striking surface 10*s*.

In use, thus, when the secondary rotor 10 of the fluid turbine 1 is put in rotation by the fluid flowing from the plurality of hollow arms 3*a* of the main rotor 3, this fluid strikes the plurality of blades 10*b* of the secondary rotor 10, in such a way that each blade of the plurality of blades 10*b* defines a striking surface for the fluid coming from the main rotor 3, in particular for the fluid flowing, in use, from the plurality of hollow arms 3*a*. More precisely, the fluid that strikes the plurality of blades 10*b* strikes a striking surface 10*s* that defines a substantially curved wall extending mainly on a plane which is substantially orthogonal to the rotation plane of the secondary rotor 10 and is deviated along a substantially curved path at least partially extending radially with respect to the longitudinal rotation axis X.

Due to the reaction force that is created on the striking surface 10*s* of each of the blades, it is thus clear that the step of making a secondary rotor 10 of the fluid turbine 1 rotate causes said secondary rotor 10 rotate in a direction which is opposite to the direction of rotation of the main rotor 3. It is thus clear that the secondary rotor 10 is configured to rotate in a direction that is opposite to the rotation direction of the main rotor 3.

Figure 3:
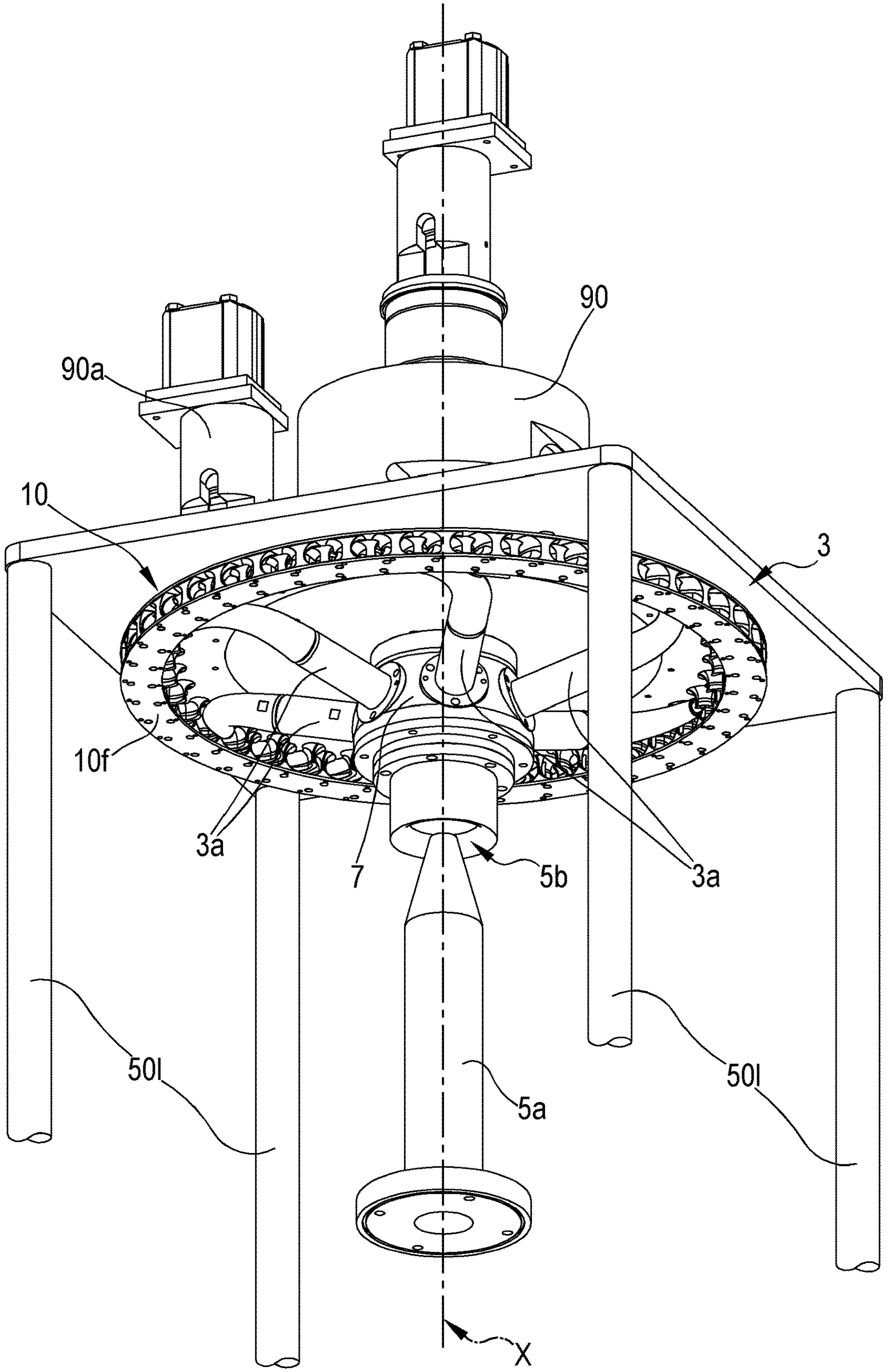
FIG. 3 shows a perspective view of part of the turbine according to the present disclosure, seen from a bottom part thereof.
Figure 4:
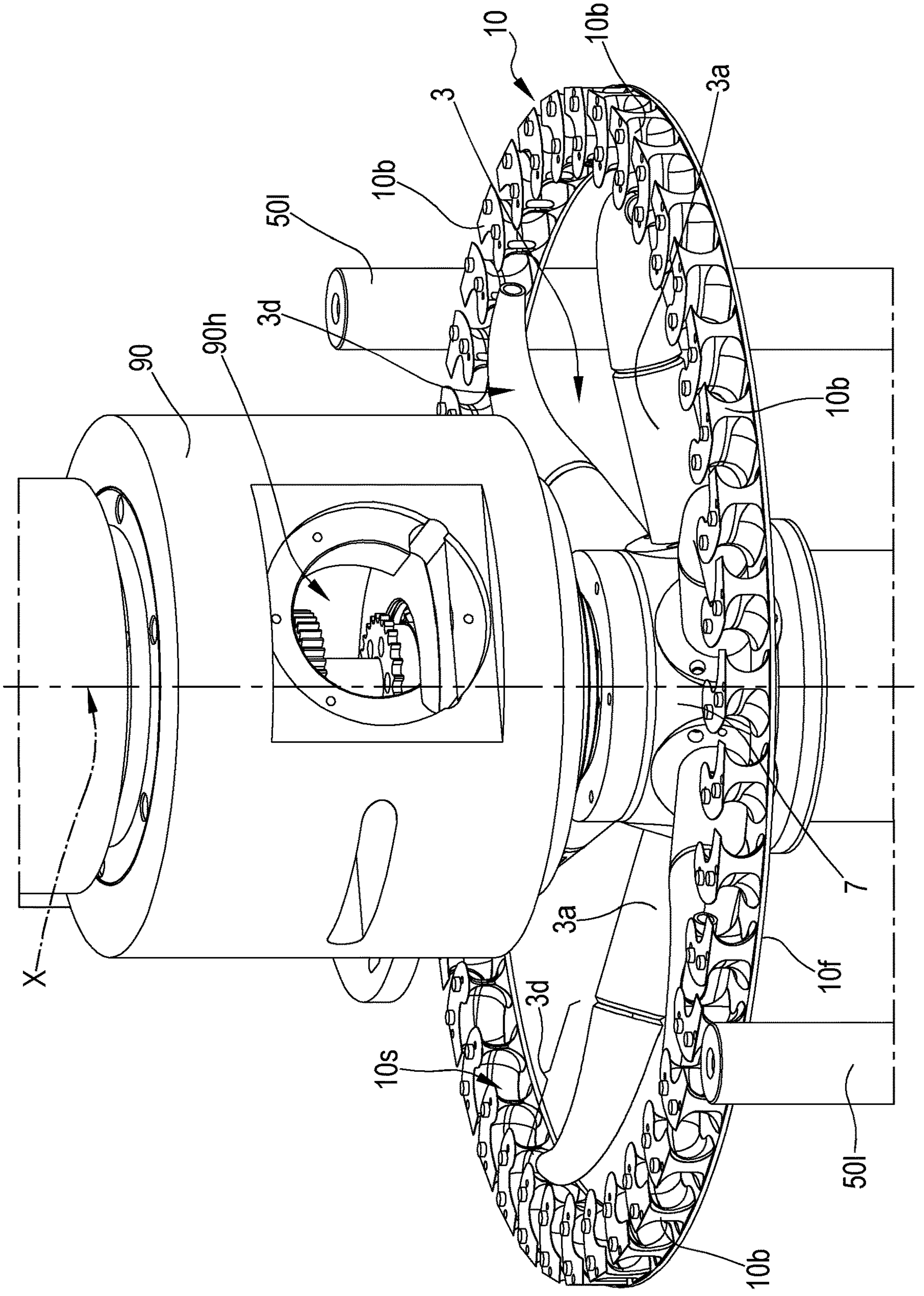
FIG. 4 shows a perspective view of a gear assembly of the fluid turbine, conceived for allowing torque to be transferred to an auxiliary device, e.g. an electric generator.

The annexed figures, and in particular at least FIG. 3 and FIG. 5, show a particular embodiment of the secondary rotor 10 provided with a first supporting disc 10*f* and with a second supporting disc 10*f*; the purpose of those two first, second supporting discs 10*f* is to connect together the several blades 10*b* of the secondary rotor 10 in such a way that they assume a specific fixed respective distance and/or position. It is herewith noted that the presence of two supporting discs 10*f* shall not be considered compulsory. In fact, at least one supporting disc 10*f* may be sufficient for achieving the technical effect of making the several blades 10*b* be linked together to assume a specific fixed respective distance and/or position. In this latter case, the single supporting disc 10*f* may be arranged at the top of the secondary rotor 10, i.e. above the blades 10*b*, or at the bottom of the secondary rotor 10, i.e. below the blades 10*b*.

FIGS. 9 and 10 show a particular embodiment of the Venturi conduit 5. This particular embodiment is conceived for the purpose of increasing the stability of the fluid flow downstream the first inlet 5*a* and the second inlet 5*b*. The Applicant in fact noticed that due to the rotation of the main rotor 3 and of the central distributor 7, this rotation may cause the fluid flow into the Venturi conduit 5 to assume a vortex or helical path that, in turn, may cause a reduction of energetic efficiency. For this purpose, the Applicant conceived at least one embodiment of the Venturi conduit 5 which comprises at least one, preferably a plurality of, fluid driving elements 5*d* arranged downstream the first inlet 5*a* and/or downstream the second inlet 5*b*. The fluid driving elements 5*d* are configured to keep a laminar and/or non-whirling fluid flow.

In the specific configuration disclosed in FIGS. 9 and 10, the fluid driving elements 5*d* extend parallel one another and/or have at least a side contacting the inner wall of the Venturi conduit 5. This configuration shall not be considered as limiting, since other configurations for the fluid driving elements 5*d* may be useful to avoid the aforementioned whirling or vortex or helical path, and thus may be useful to keep the laminar flow.

Specifically, in the embodiment shown in FIGS. 10 and 11, the fluid driving elements 5*d* radially develop from an inner wall of the Venturi conduit 5, and the fluid driving elements 5*d* have a main development extension parallel to the longitudinal rotation axis X. It is herewith considered that the fluid driving elements 5*d* may only have a radial development from the inner wall of the Venturi conduit 5 without being substantially parallel to the longitudinal rotation axis X.

It is further noted that the embodiment of FIGS. 10 and 11 further shows the presence of a flow return preventing element 5*v* on the Venturi conduit 5. This flow return preventing element 5*v* may be present with the fluid driving elements 5*d*, or may be part of another embodiment of the Venturi conduit 5 that has no fluid driving elements 5*d* arranged therein.

In detail, the flow return preventing element 5*v* is arranged substantially in correspondence of the second inlet 5*b* and preferably comprises a plurality of sheet elements overall defining a substantially helical or vortex shape. This shape contrasts the reverse flow of the fluid in case of low rotation speeds for the main rotor 3 and which may be originated by the substantially vertical arrangement of the Venturi conduit. The flow return preventing element 5*v* substantially protrudes outwardly the second inlet 5*b*.

The secondary rotor 10 is installed, in particular is fixed, on a flange 35, which is configured to support the secondary rotor 10. This flange 35 is ring-shaped and is centered on the longitudinal rotation axis X. The flange 35 rotates solidly with the secondary rotor 10. The flange 35 is preferably realized in metal. The flange 35 is connected to the auxiliary rotation shaft 2*x*.

In the embodiment shown in the annexed figures, the flange 35 is installed at least partially above the secondary rotor 10. This means that the secondary rotor 10 and the flange 35, in at least one preferred, non-limiting, embodiment, rotate on two planes which are separate one another but in any case parallel one another.

The secondary rotor 10 is configured to rotate independently and/or freely with respect to the main rotor 3. For this purpose, at least one bearing 36, preferably a plurality of bearings 36, is installed on the main rotation shaft 2 (which, it is recalled, is fixedly connected to the main rotor 3 in such a way to be put in rigid rotation therewith). The plurality of bearings 36 comprises at least two superimposed bearings. The inner opening of the bearing 36 allows the passage of the main rotation shaft 2 and the outer portion of the bearing 36 is fixed to the flange 35. This allows the substantially least possible friction force between the (inner) main rotor 3 and the (outer) secondary rotor 10 while rotating.

It is noted that in use the inertia of the flange 35 allows this latter to act as a free wheel for the fluid turbine assembly 1.

The fluid turbine assembly 1 of the present disclosure may be connected to a generator, for producing e.g. electric current. In the annexed figures the first generator 20 is connected to the main rotation shaft 2, and then at least indirectly to the main rotor 3. In use, due to the rotation of the main rotor 3, a torque is transferred to the main rotation shaft 2 and then to the first generator 20.

The fluid turbine assembly 1 is further configured to be connected to a second generator 30. This particular configuration is associated to the embodiments of the fluid turbine assembly 1 wherein there is the secondary rotor 10. In detail, the second generator 30 is connected to an auxiliary rotation shaft identified by the reference number 2*x*. Thus in an embodiment the fluid turbine assembly 1 may comprise two, preferably independent, generators. This allows to increase the flexibility of energy production. In use, the method of actuation of the fluid turbine assembly 1 herein disclosed thus comprises providing torque to an auxiliary rotation shaft 2*x*, and such torque is generated by the secondary rotor 10. Thus torque is provided to the second generator.

In an embodiment, the first generator 20 may be installed coaxially on the main rotation shaft. In an embodiment, the fluid turbine assembly 1 may comprise a torque sensing device 70 arranged on the main rotation shaft 14 in order to provide indication about how much power is provided by the main rotor.

In another embodiment, the fluid turbine assembly 1 herein disclosed may comprise a main gearing assembly 90 configured to provide torque on an auxiliary shaft which is sensibly inclined with respect to the main rotation shaft 2. In this latter case, as represented in the annexed figures, the main gearing assembly 90 may comprise a cover and at least a couple of gears in use rotating on two substantially orthogonal planes. The cover may comprise an opening 90*h* for allowing the coupling of said auxiliary shaft to the gears of the gearing assembly. In a preferred and non-limiting embodiment, the opening 90*h* is arranged on a lateral wall of the main gearing assembly 90, for allowing the connection of an output shaft not axially aligned with the main rotation shaft 2. In the specific embodiment of the figure, the output shaft connects the main rotation shaft 2 at a direction substantially orthogonal thereto.

In detail, and as shown in FIG. 5, the gearing assembly may further comprise at least a first gear keyed on the main rotation shaft 2 and a second gear keyed on the auxiliary rotation shaft 2*x*. The annexed figures further show an auxiliary gearing assembly 90*a*, which is not axially aligned with the longitudinal rotation axis. This auxiliary gearing assembly 90*a* further comprises an own gear that is horizontally aligned with the second gear of the main gearing assembly 90. The gear of the auxiliary gearing assembly 90*a* is driven in rotation by a connection element, in particular a chain, not represented in the annexed figures.

The fluid turbine assembly 1 according to the present disclosure is very efficient, and thus can overcome the overall efficiency that is typical of the turbines of the known art in a plurality of conditions.

It is herewith noted that the disclosure is not limited to the embodiments shown in the annexed figures. For such reasons, when in the following claims technical elements of the fluid turbine assembly 1 are followed by reference signs or numbers arranged between parentheses, such reference signs or numbers are provided for the sole purpose of increasing the intelligibility of the claims, and thus shall not be considered as limiting.

The invention claimed is:

1. A fluid turbine assembly, comprising:

at least a main rotation shaft being configured to rotate around a longitudinal rotation axis;

a main rotor comprising a central portion and an outer portion, the main rotor being installed on the main rotation shaft in such a way to bring the main rotation shaft in rotation with the main rotor; and an inlet assembly for a fluid, said inlet assembly being configured to drive the fluid to the main rotor, wherein said inlet assembly comprises a Venturi conduit comprising a first inlet configured to be connected to, and to be fed in use with, a pressurized primary fluid source, and a second inlet configured to be submerged into, and to drag fluid from, a secondary fluid source to the rotor under the dragging effect caused by the fluid flowing in said first inlet;

wherein the main rotor comprises a plurality of hollow arms at least partially arranged along a radial direction, said plurality of hollow arms realizing a plurality of fluid distribution conduits configured to allow, in use, the distribution of fluid from the central portion of the main rotor to the outer portion of the main rotor; and wherein each arm of the plurality of hollow arms comprises a central portion, and a distal portion positioned at the outer portion of the main rotor, each distal portion being arranged in a direction inclined with respect to the radial direction and to said longitudinal rotation axis, and being configured to direct, in use, the fluid to a predetermined direction to cause the rotation of the main rotor by means of a reaction force.

2. The fluid turbine assembly according to claim 1, wherein:

the fluid comprises water;

the pressurized primary fluid source comprises a fluid reservoir or comprises at least a part of a penstock fed by a fluid reservoir; and the fluid turbine assembly is configured to:

re-use at least partially the fluid discharged by the main rotor.

3. The fluid turbine assembly according to claim 1, wherein:

the Venturi conduit is configured to be fed in such a way that at least the second inlet lies below a fluid level of said secondary fluid source; and/or wherein the Venturi conduit is configured in such a way that, in use, the second inlet drags only fluid from the secondary fluid source; and/or wherein the Venturi conduit is configured to be fed in such a way that at least the first inlet lies below a fluid level of said pressurized primary fluid source; and/or the Venturi conduit is configured in such a way that, in use, the first inlet drags only fluid from the pressurized primary fluid source; and wherein:

the Venturi conduit is aligned with the main rotation shaft;

the second inlet annularly surrounds at least a part of the first inlet and/or has a funnel-type shape, optionally wherein said funnel-type shape is configured to draw fluid from around at least one portion of the first inlet; and the first inlet is axially aligned with the main rotation shaft.

4. The fluid turbine assembly according to claim 3, wherein:

the main rotor comprises a central distributor comprising an inlet opening and a plurality of outlets connected in a fluid-tight connection each with a respective arm of said plurality of hollow arms;

the central distributor is configured to distribute fluid from the inlet opening to the plurality of outlets by means of a redirection of the fluid provided to the main rotor from an axial direction associated to the inlet opening to a plurality of radial directions associated to the plurality of outlets, wherein the axial direction is parallel to the direction of the longitudinal rotation axis; and the inlet opening of the central distributor is connected to an outlet of the Venturi conduit, optionally being directly connected to the outlet of the Venturi conduit, the central distributor being rigidly connected with the plurality of hollow arms.

5. The fluid turbine assembly according to claim 1, wherein:

the inlet assembly is configured to feed fluid to the central portion of the main rotor;

the plurality of hollow arms is configured to distribute fluid uniformly along a plurality of directions, each direction being associated to at least one of said hollow arms; and the main rotor is configured to distribute fluid at least partially by means of a centrifugal force on said fluid due to the rotation of the main rotor around the longitudinal rotation axis.

6. The fluid turbine assembly according to claim 5, wherein:

each distal portion has a cross-section of a first size and the central portion of each arm having a cross-section of a second size, the first size being smaller than the second size, each distal portion being configured to increase an outlet fluid flow speed for the fluid exiting the main rotor, each distal portion constituting an outlet nozzle for the hollow arm;

wherein the direction inclined with respect to a radial direction is arranged on a plane of rotation of the main rotor; and wherein each distal portion is oriented backwardly with respect to a direction of rotation of the main rotor.

7. The fluid turbine assembly according to claim 1, further comprising:

a secondary rotor, said secondary rotor being configured to be fed by fluid coming from the main rotor; and an auxiliary rotation shaft operatively coupled and, in use, put in rotation, by said secondary rotor;

wherein the secondary rotor is configured to discharge said fluid into the secondary fluid source, optionally to discharge said fluid directly into the secondary fluid source; and/or wherein:

wherein the auxiliary rotation shaft rotates around an axis which is parallel to said longitudinal rotation axis, optionally the auxiliary rotation shaft being co-axial with the main rotation shaft, the auxiliary rotation shaft being hollow and comprising a through hole configured to house part of the main rotation shaft; and the through hole is axially aligned with the longitudinal rotation axis.

8. The fluid turbine assembly according to claim 7, wherein:

the secondary rotor is an annular rotor laying outside the main rotor;

the secondary rotor is centered on said longitudinal rotation axis; and the secondary rotor is configured to rotate freely from the main rotor and/or with respect to the main rotor.

9. The fluid turbine assembly according to claim 7, wherein:

the secondary rotor comprises a plurality of blades defining, each one, a striking surface for the fluid coming, in use, from the plurality of hollow arms;

the striking surface defines a curved wall extending on a plane which is orthogonal to the rotation plane of the secondary rotor and is configured to deviate a fluid flow along a curved path at least partially extending radially with respect to the longitudinal rotation axis; and the secondary rotor is configured and designed to rotate, in use, in a direction opposite to a rotation direction of the main rotor, due to a force that the fluid flowing, in use, from the plurality of hollow arms causes on the striking surface of the plurality of blades.

10. The fluid turbine assembly according to claim 1, wherein:

the Venturi conduit comprises at least one fluid driving elements arranged downstream of the first inlet and/or downstream of the second inlet, said fluid driving elements being configured to keep a laminar and/or non-whirling fluid flow, the fluid driving elements having a main development extension parallel to the longitudinal rotation axis; and/or the Venturi conduit comprises a flow return preventing element attached to the second inlet.

11. A method of actuating a fluid turbine assembly, the method comprising:

providing at least a main rotation shaft being configured to rotate around a longitudinal rotation axis;

providing a main rotor comprising a central portion and an outer portion, the main rotor being installed on the main rotation shaft in such a way to bring the main rotation shaft in rotation with the main rotor;

providing an inlet assembly for a fluid, said inlet assembly being configured to drive the fluid to the main rotor, wherein said inlet assembly comprises a Venturi conduit comprising a first inlet configured to be connected to, and to be fed in use with, a pressurized primary fluid source, and a second inlet configured to be submerged into, and to drag fluid from, a secondary fluid source to the rotor under the dragging effect caused by the fluid flowing in said first inlet;

wherein the main rotor comprises a plurality of hollow arms at least partially arranged along a radial direction, said plurality of hollow arms realizing a plurality of fluid distribution conduits configured to allow, in use, the distribution of fluid from the central portion of the main rotor to the outer portion of the main rotor; and wherein each arm of the plurality of hollow arms comprises a central portion, and a distal portion positioned at the outer portion of the main rotor, each distal portion being arranged in a direction inclined with respect to the radial direction and to said longitudinal rotation axis, and being configured to direct, in use, the fluid to a predetermined direction to cause the rotation of the main rotor by means of a reaction force; and providing fluid from the inlet assembly to the main rotor, thereby driving rotation of the main rotor;

wherein the step of providing fluid to the main rotor comprises:

feeding the fluid to the first inlet of the inlet assembly by way of the pressurized primary fluid source which, in turn, feeds the fluid to the Venturi conduit of the inlet assembly; and feeding the fluid to the second inlet of the inlet assembly with the fluid dragged from the secondary fluid source in such a way that the fluid dragged from the secondary fluid source can be driven to the rotor under the dragging effect caused by the fluid flowing in said first inlet.

12. The method according to claim 11, wherein:

feeding the fluid to the Venturi conduit comprises submersing the Venturi conduit in the fluid, such that at least the second inlet lies below a fluid level of said secondary fluid source and/or such that the second inlet drags only fluid from said secondary fluid source; and/or wherein the step of feeding the fluid to the Venturi conduit by submersing the Venturi conduit in the fluid, is such that at least the first inlet lies below a fluid level of said pressurized primary fluid source and/or is such that the first inlet drags only fluid from said pressurized primary fluid source.

13. The method according to claim 11, wherein:

the fluid comprises water;

the pressurized primary fluid source comprises a fluid reservoir and/or comprises at least a part of a penstock fed by a fluid reservoir; and feeding the fluid to the first inlet with the pressurized primary fluid source is a step of feeding the fluid to the first inlet by a fluid reservoir and/or by at least part of a penstock fed by a fluid reservoir; and/or:

wherein the method comprises:

discharging fluid provided to the main rotor through the inlet assembly in said secondary fluid source;

at least partially re-using fluid discharged by the main rotor for feeding the fluid to the second inlet with the fluid discharged by the main rotor; and filling and/or keeping filled the secondary fluid source with fluid, in such a way that the fluid contained in the secondary fluid source reaches at least the second inlet, optionally the second inlet and the first inlet.

14. The method according to claim 11, further comprising:

aligning the Venturi conduit with the main rotation shaft, wherein:

the second inlet annularly surrounds at least a part of the first inlet and/or has a funnel-type shape, and the feeding of fluid to the Venturi conduit comprises drawing fluid from around at least one portion of the first inlet; and wherein aligning the Venturi conduit with the main rotation shaft causes the first inlet to be aligned with the main rotation shaft.

15. The method according to claim 11, wherein:

the step of providing fluid to the inlet assembly causes the step of actuating the main rotor to rotate by feeding the fluid to the central portion of the main rotor, said plurality of hollow arms realizing a plurality of fluid distribution conduits, and providing fluid to the main rotor by means of the inlet assembly causes distributing fluid from the central portion of the main rotor to the outer portion of the main rotor by means of the plurality of hollow arms;

providing fluid to the main rotor by means of the inlet assembly causes a uniform distribution of fluid along a plurality of directions through said hollow arms, each direction being associated to at least one of said hollow arms; and the rotation of the main rotor around said longitudinal rotation axis causes a distribution of fluid taking place at least partially by means of a centrifugal force exerted on the fluid due to the rotation of the main rotor, due to the rotation of the plurality of hollow arms of the main rotor, said rotation causing the fluid to be drawn from the central portion of the main rotor to the outer portion of the main rotor.

16. The method according to claim 15, further comprising:

increasing an outlet fluid flow speed for the fluid exiting the main rotor by making the fluid pass through a distal portion having a cross-section of a first size, the central portion having a cross-section of a second size, the first size being smaller than the second size, each distal portion constituting an outlet nozzle for one of the hollow arms; and making the fluid exit from each distal portion causing the main rotor to rotate in a direction which is opposite to a backward direction along which the respective distal portion is aligned.

17. The method according to claim 11, wherein:

the main rotor comprises a central distributor comprising an inlet opening and a plurality of outlets connected in a fluid-tight connection each with a respective arm of said plurality of hollow arms and providing the fluid to the main rotor causes feeding fluid to the inlet opening of the central distributor and a redirection of the fluid provided to the main rotor from an axial direction associated to the inlet opening to a plurality of radial directions associated to the plurality of outlets;

the axial direction is parallel to the direction of the longitudinal rotation axis;

the feeding of fluid to the inlet opening of the central distributor is provided by an outlet of the Venturi conduit, optionally is directly provided by the outlet of the Venturi conduit; and the central distributor is rigidly connected to the plurality of hollow arms.

18. The method according to claim 11, comprising:

a step of making a secondary rotor of the fluid turbine assembly rotate by feeding the secondary rotor with fluid coming from the main rotor;

putting in rotation an auxiliary rotation shaft operatively coupled to said secondary rotor;

a step of discharging the fluid fed to the secondary rotor into the secondary fluid source, and optionally a step of discharging the fluid fed to the secondary rotor directly into the secondary fluid source;

wherein:

putting in rotation the auxiliary rotation shaft involves making said auxiliary rotation shaft rotate around an axis which is parallel to said longitudinal rotation axis; and/or putting in rotation the auxiliary rotation shaft involves making said auxiliary rotation shaft rotate co-axially with the main rotation shaft, said auxiliary rotation shaft being hollow and comprising a through hole configured to house part of the main rotation shaft, wherein the through hole is axially aligned with the longitudinal rotation axis.

19. The method according to claim 18, wherein:

the step of making the secondary rotor of the fluid turbine assembly rotate causes the secondary rotor, being an annular rotor laying outside the main rotor, to rotate outside the main rotor; and/or the step of making the secondary rotor of the fluid turbine assembly rotate causes a rotation of the secondary rotor on a rotation axis which is centered on said longitudinal rotation axis;

the step of making the secondary rotor rotate comprises making the secondary rotor rotate freely from the main rotor and/or with respect to the main rotor; and/or wherein the step of making the secondary rotor of the fluid turbine assembly rotate causes the fluid flowing from the plurality of hollow arms of the main rotor to strike a plurality of blades of the secondary rotor, each blade of the plurality of blades defining a striking surface for the fluid flowing, in use, from the plurality of hollow arms;

wherein each striking surface defines a curved wall extending on a plane which is orthogonal to the rotation plane of the secondary rotor and is deviated along a curved path at least partially extending radially with respect to the longitudinal rotation axis;

the step of making the secondary rotor of the fluid turbine assembly rotate causing said secondary rotor to rotate in a direction which is opposite to the direction of rotation of the main rotor, due to a force that the fluid flowing, in use, from the plurality of hollow arms causes on each striking surface of the plurality of blades.

20. The method according to claim 11, wherein:

feeding the fluid to the Venturi conduit comprises making said fluid flow through at least one fluid driving element arranged downstream of the first inlet and/or downstream of the second inlet, said at least one fluid driving element being configured to keep a laminar and/or non-whirling fluid flow, the at least one fluid driving element being optionally arranged parallel to the longitudinal rotation axis; and/or feeding the fluid to the Venturi conduit comprises making said fluid flow through a flow return preventing element, arranged in correspondence of the second inlet, optionally the flow return preventing element having a plurality of sheet elements overall defining a helical or vortex shape.

* * * * *